US012633080B2

(12) United States Patent
Rezaei et al.

(10) Patent No.: US 12,633,080 B2
(45) Date of Patent: May 19, 2026

(54) SYSTEMS AND METHODS FOR INSPECTION OF GAS PLUME USING OBJECT DETECTION AND SEGMENTATION MODELS

(71) Applicant: Cameron International Corporation, Houston, TX (US)

(72) Inventors: Ali Rezaei, Houston, TX (US); Nasser Ghorbani, Houston, TX (US); Oleg O. Medvedev, Missouri City, TX (US)

(73) Assignee: Cameron International Corporation, Houston, TX (US)

( * ) Notice: Subject to any disclaimer, the term of this patent is extended or adjusted under 35 U.S.C. 154(b) by 47 days.

(21) Appl. No.: 18/968,487

(22) Filed: Dec. 4, 2024

(65) Prior Publication Data

US 2025/0182434 A1 Jun. 5, 2025

Related U.S. Application Data

(60) Provisional application No. 63/606,222, filed on Dec. 5, 2023.

(51) Int. Cl.
*G06V 10/25* (2022.01)
*G06T 7/10* (2017.01)
(Continued)

(52) U.S. Cl.
CPC ................ *G06V 10/25* (2022.01); *G06T 7/10* (2017.01); *G06T 7/20* (2013.01); *G06T 7/62* (2017.01);
(Continued)

(58) Field of Classification Search
CPC .... G06V 10/25; G06V 20/17; G06V 2201/07; G06T 7/10; G06T 7/20; G06T 7/62;
(Continued)

(56) References Cited

U.S. PATENT DOCUMENTS

2020/0320659 A1 10/2020 Whiting
2023/0070330 A1* 3/2023 Blanco ...................... G06T 7/33
(Continued)

FOREIGN PATENT DOCUMENTS

WO 2023102553 A2 6/2023

OTHER PUBLICATIONS

Enhancing Autonomous Driving with Grounded-Segment Anything Model: Limitations and Mitigations, 2023 IEEE 3rd International Conference on Data Science and Computer Application (ICDSCA), Dalian, China, 2023, pp. 1258-1265 (Year: 2023).*
Huamanchahua, D. et al., "Ground Robots for Inspection and Monitoring: A State-of-the-Art Review", IEEE 12th Annual Ubiquitous Computing, Electronics Mobile Communication Conference (UEMCON), Dec. 2021.
(Continued)

*Primary Examiner* — Andrew W Bee
*Assistant Examiner* — Rebecca Colette Williams
(74) *Attorney, Agent, or Firm* — Kyle R. Miiller

(57) ABSTRACT

A system for inspecting one or more gas plumes in a facility, including a processor and a memory having instructions executable by the processor, wherein the instructions are configured to obtain one or more images from one or more cameras, wherein the one or more images include a gas plume. The instructions are further configured to focus the one or more images on an area of interest with an object detection model to generate a boundary box around the gas plume, and focus the one or more images on the area of interest with a segmentation model to generate a mask around the gas plume based on the boundary box. The instructions are further configured to obtain one or more masked images from the segmentation model, and analyze the one or more masked images to obtain an image analysis of one or more parameters of the gas plume.

17 Claims, 8 Drawing Sheets

200 ─╮
202 ─ OPERATE A FACILITY HAVING A PLURALITY OF EQUIPMENT
204 ─ OBTAIN FEEDBACK FROM SENSORS AND CAMERAS AT FIXED POSITIONS IN THE FACILITY
206 ─ OBTAIN FEEDBACK FROM SENSORS AND CAMERAS VIA AN UNMANNED AUTONOMOUS VEHICLE (UAV)
208 ─ FOCUS ON AREA OF INTEREST (AOI) OF OBJECT IN FEEDBACK (E.G., IMAGES) FROM CAMERAS VIA MULTI-MODEL PROCESS (E.G., OBJECT DETECTION AND SEGMENTATION MODELS)
210 ─ ANALYZE FEEDBACK (E.G., IMAGES) FROM CAMERAS WITHIN AOI TO OBTAIN IMAGE ANALYSIS OF OBJECT
212 ─ ANALYZE FEEDBACK FROM SENSORS TO OBTAIN SENSOR ANALYSIS OF OBJECT
214 ─ EVALUATE IMAGE ANALYSIS AND SENSOR ANALYSIS TOGETHER TO OBTAIN OBJECT ANALYSIS
216 ─ DETECT ANOMALY BASED ON OBJECT ANALYSIS
218 ─ QUANTIFY ANOMALY BASED ON COMPARISON WITH THRESHOLDS, HISTORICAL DATA, AND COMPUTER MODELS (AI)
220 ─ PERFORM ACTIONS BASED ON THE ANOMALY
222 ─ OUTPUT A NOTIFICATION AND / OR A REPORT
224 ─ EXECUTE AN INSPECTION VIA SENSORS AND / OR CAMERAS
226 ─ SCHEDULE AN INSPECTION / SERVICE BY A TECHNICIAN
228 ─ GENERATE A SAFE ROUTE FOR THE TECHNICIAN TO REACH THE LOCATION OF THE ANOMALY
230 ─ EXECUTE A ROOT CAUSE ANALYSIS OF THE ANOMALY
232 ─ ADJUST ONE OR MORE OPERATING PARAMETERS OF THE FACILITY BASED ON THE ANOMALY

(51) Int. Cl.

| | |
|---|---|
| *G06T 7/20* | (2017.01) |
| *G06T 7/62* | (2017.01) |
| *G06T 7/70* | (2017.01) |
| *G06V 20/17* | (2022.01) |

(52) U.S. Cl.
CPC ................ G06T 7/70 (2017.01); G06V 20/17 (2022.01); *G06V 2201/07* (2022.01)

(58) Field of Classification Search
CPC ............. G06T 7/70; G06T 2207/10016; G06T 2207/10024; G06T 2207/10032; G06T 2207/10048; G06T 2207/20081; G06T 2207/30108; G06T 7/0004; G06T 7/11
See application file for complete search history.

(56) References Cited

U.S. PATENT DOCUMENTS

| | | | | |
|---|---|---|---|---|
| 2023/0306572 A1* | 9/2023 | Mishra | .................. | G06T 7/0002 |
| 2025/0131644 A1* | 4/2025 | Tao | ......................... | G06T 15/08 |

OTHER PUBLICATIONS

Kirillov, A. et al., "Segment Anything", arxiv labs, Apr. 5, 2023, 30 Pages.

Pedrayes, O. D. et al., "Detection and localization of fugitive emissions in industrial plants using surveillance cameras", Computers in Industry. Nov. 2022, pp. 103731, vol. 142.

Redmon, J. et al., "You Only Look Once: Unified, Real-Time Object Detection", IEEE Conference on Computer Vision and Pattern Recognition (CVPR), May 9, 2016, 10 Pages.

Wang, J. et al., "VideoGasNet: Deep learning for natural gas methane leak classification using an infrared camera", Energy, Jan. 1, 2022, pp. 121516, vol. 238.

Imtiaz Hafiz Hashim et al., "A Gas Imaging Sensor System of Automotive Exhaust Plumes for Remote Emission Sensing Application Basing on Schlieren Imaging an Approach to Visualize and Size Vehicle Exhaust Plumes", 2023 IEEE Sensors, IEEE, Oct. 29, 29, 2023, pp. 1-4.

Alexander Kirillov et al., "Segment Anything", Arxiv.org, Cornell University Library, 201 Olin Library Cornell University Ithaca, NY 14853, Apr. 5, 2023.

* cited by examiner

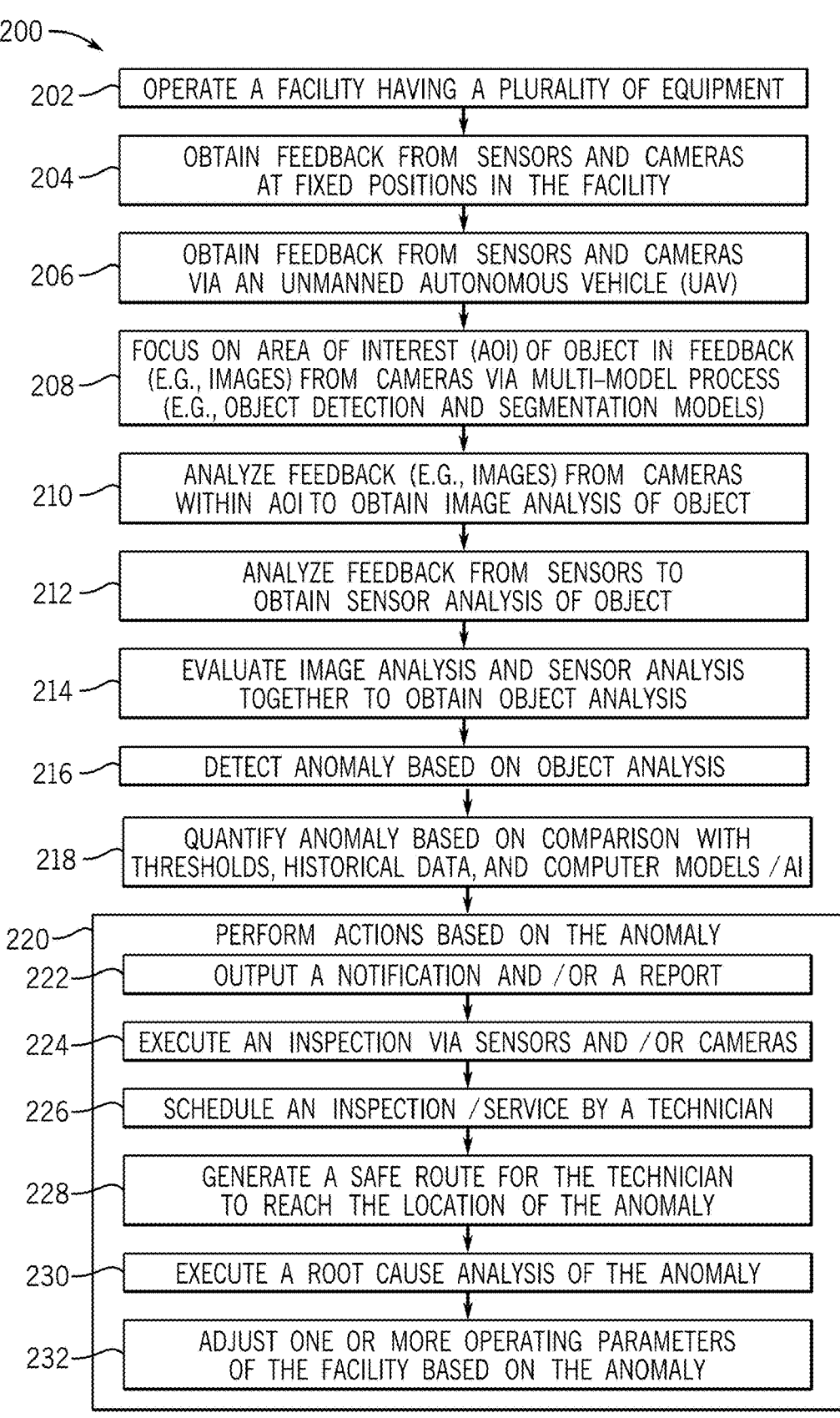

200

202 — OPERATE A FACILITY HAVING A PLURALITY OF EQUIPMENT

204 — OBTAIN FEEDBACK FROM SENSORS AND CAMERAS AT FIXED POSITIONS IN THE FACILITY

206 — OBTAIN FEEDBACK FROM SENSORS AND CAMERAS VIA AN UNMANNED AUTONOMOUS VEHICLE (UAV)

208 — FOCUS ON AREA OF INTEREST (AOI) OF OBJECT IN FEEDBACK (E.G., IMAGES) FROM CAMERAS VIA MULTI-MODEL PROCESS (E.G., OBJECT DETECTION AND SEGMENTATION MODELS)

210 — ANALYZE FEEDBACK (E.G., IMAGES) FROM CAMERAS WITHIN AOI TO OBTAIN IMAGE ANALYSIS OF OBJECT

212 — ANALYZE FEEDBACK FROM SENSORS TO OBTAIN SENSOR ANALYSIS OF OBJECT

214 — EVALUATE IMAGE ANALYSIS AND SENSOR ANALYSIS TOGETHER TO OBTAIN OBJECT ANALYSIS

216 — DETECT ANOMALY BASED ON OBJECT ANALYSIS

218 — QUANTIFY ANOMALY BASED ON COMPARISON WITH THRESHOLDS, HISTORICAL DATA, AND COMPUTER MODELS / AI

220 — PERFORM ACTIONS BASED ON THE ANOMALY

222 — OUTPUT A NOTIFICATION AND / OR A REPORT

224 — EXECUTE AN INSPECTION VIA SENSORS AND / OR CAMERAS

226 — SCHEDULE AN INSPECTION / SERVICE BY A TECHNICIAN

228 — GENERATE A SAFE ROUTE FOR THE TECHNICIAN TO REACH THE LOCATION OF THE ANOMALY

230 — EXECUTE A ROOT CAUSE ANALYSIS OF THE ANOMALY

232 — ADJUST ONE OR MORE OPERATING PARAMETERS OF THE FACILITY BASED ON THE ANOMALY

FIG. 3

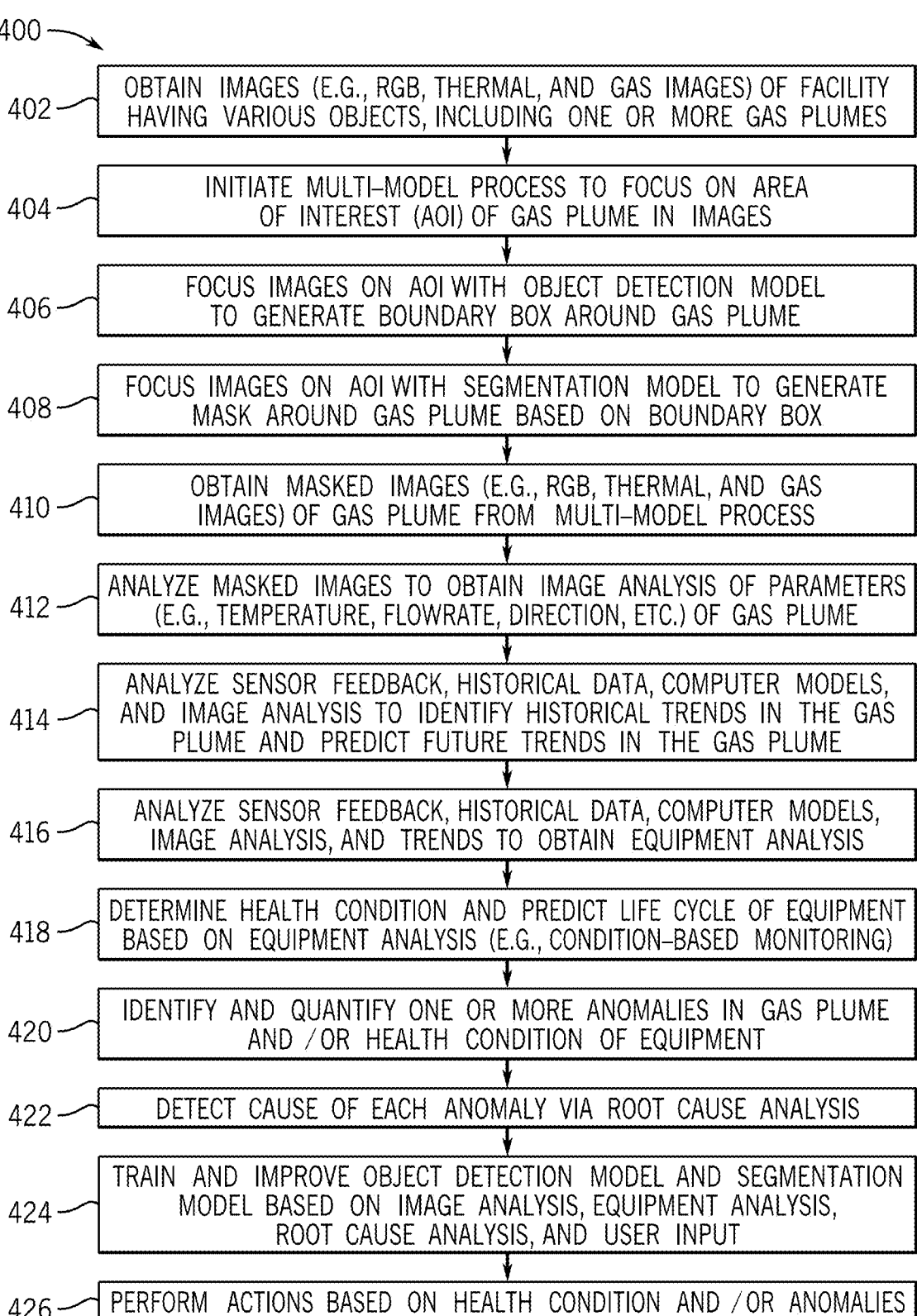

400

402 — OBTAIN IMAGES (E.G., RGB, THERMAL, AND GAS IMAGES) OF FACILITY HAVING VARIOUS OBJECTS, INCLUDING ONE OR MORE GAS PLUMES

404 — INITIATE MULTI-MODEL PROCESS TO FOCUS ON AREA OF INTEREST (AOI) OF GAS PLUME IN IMAGES

406 — FOCUS IMAGES ON AOI WITH OBJECT DETECTION MODEL TO GENERATE BOUNDARY BOX AROUND GAS PLUME

408 — FOCUS IMAGES ON AOI WITH SEGMENTATION MODEL TO GENERATE MASK AROUND GAS PLUME BASED ON BOUNDARY BOX

410 — OBTAIN MASKED IMAGES (E.G., RGB, THERMAL, AND GAS IMAGES) OF GAS PLUME FROM MULTI-MODEL PROCESS

412 — ANALYZE MASKED IMAGES TO OBTAIN IMAGE ANALYSIS OF PARAMETERS (E.G., TEMPERATURE, FLOWRATE, DIRECTION, ETC.) OF GAS PLUME

414 — ANALYZE SENSOR FEEDBACK, HISTORICAL DATA, COMPUTER MODELS, AND IMAGE ANALYSIS TO IDENTIFY HISTORICAL TRENDS IN THE GAS PLUME AND PREDICT FUTURE TRENDS IN THE GAS PLUME

416 — ANALYZE SENSOR FEEDBACK, HISTORICAL DATA, COMPUTER MODELS, IMAGE ANALYSIS, AND TRENDS TO OBTAIN EQUIPMENT ANALYSIS

418 — DETERMINE HEALTH CONDITION AND PREDICT LIFE CYCLE OF EQUIPMENT BASED ON EQUIPMENT ANALYSIS (E.G., CONDITION-BASED MONITORING)

420 — IDENTIFY AND QUANTIFY ONE OR MORE ANOMALIES IN GAS PLUME AND /OR HEALTH CONDITION OF EQUIPMENT

422 — DETECT CAUSE OF EACH ANOMALY VIA ROOT CAUSE ANALYSIS

424 — TRAIN AND IMPROVE OBJECT DETECTION MODEL AND SEGMENTATION MODEL BASED ON IMAGE ANALYSIS, EQUIPMENT ANALYSIS, ROOT CAUSE ANALYSIS, AND USER INPUT

426 — PERFORM ACTIONS BASED ON HEALTH CONDITION AND /OR ANOMALIES

FIG. 5

SYSTEMS AND METHODS FOR INSPECTION OF GAS PLUME USING OBJECT DETECTION AND SEGMENTATION MODELS

CROSS-REFERENCE TO RELATED APPLICATION

The present application is a U.S. Non-Provisional Patent Application claiming benefit of U.S. Provisional Patent Application No. 63/606,222, entitled "GAS LEAK DETECTION USING UNMANNED AUTONOMOUS VEHICLES", filed Dec. 5, 2023, which is herein incorporated by reference.

BACKGROUND

The present disclosure generally relates to systems and methods for gas leak detection in a facility using images from cameras.

Inspections of oil and gas facilities for hazardous gas and liquid leaks are expensive, cumbersome, and prone to errors. These inspections are typically done regularly (e.g., monthly, quarterly, annually) by certified third-party contractors. However, if a leak occurs shortly after an inspection, by the time the subsequent scheduled inspection is due, the leak could have raised several health, safety, and environment (HSE) concerns and problems. These issues include human exposure to dangerous gases, such as hydrogen sulfide or methane (one of the main elements of global warming), that are unintentionally released into the atmosphere, also known as fugitive leaks.

Fugitive oil and gas industry emission monitoring and inspections are typically carried out using Leak Detection And Repair (LDAR) programs. Available technologies for fugitive leak monitoring can be categorized into six groups: handheld devices, fixed sensors, mobile ground labs (MGLs), uncrewed aerial vehicles (UAVs), aircraft, and satellites. The LDAR programs are specific to gas type. For example, method 21 and optical gas imaging (OGI) methods have been approved and suggested by EPA for close-range leak detection and repair of methane. Hand-held OGI is a thermal imaging technology using high-sensitivity infrared (IR) cameras (i.e., thermal imaging cameras) to detect fugitive gas emissions and has become the EPA's recommended method. The performance of this technology depends on several parameters, such as emission rate, environmental conditions, and other factors like the system's design, adjustment, and use protocols. A problem with the handheld OGI technique is that it is a labor-intensive and expensive process. It also needs to be carried out and interpreted by an operator, subjecting the results to the operator's experience. The other EPA-approved technique is method 21, which includes a probe and analyzer. The analyzer must remain in the suspected plume area throughout the inspection. Both of these techniques expose the inspectors to the potential leaked gas and have HSE issues.

Another method widely used for close-range LDAR is fixed gas sensors. Fixed gas sensors are devices that measure the concentration of a specific gas in one single location placed near the potential leak point(s), referred to as "point sensors." On top of the hardware technologies, two outstanding problems are associated with a point sensor project: sensor placement planning and leak source quantification. To monitor gas leakage across a large area or an entire facility, simply installing the gas sensors without any plan to optimize the sensor deployment and interpretation will result in an expensive capital cost and no assurance that such deployment would bring encouraging returns.

Accordingly, a need exists for gas leak detection using images from cameras, wherein image analysis can identify gas plumes and various characteristics of the gas plumes in an efficient manner for control of equipment in the facility.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a system for inspecting one or more gas plumes in a facility includes a processor and a memory with instructions executable by the processor. The instructions are configured to obtain one or more images including a gas plume from one or more cameras; focus the one or more images on an area of interest with an object detection model to generate a boundary box around the gas plume; focus the one or more images on the area of interest with a segmentation model to generate a mask around the gas plume based on the boundary box; obtain one or more masked images from the segmentation model; and analyze the one or more masked images to obtain an image analysis of one or more parameters of the gas plume.

In certain embodiments, a method for inspecting one or more gas plumes in a facility includes obtaining one or more images including a gas plume from one or more cameras; focusing the one or more images on an area of interest with an object detection model to generate a boundary box around the gas plume; focusing the one or more images on the area of interest with a segmentation model to generate a mask around the gas plume based on the boundary box; obtaining one or more masked images from the segmentation model; and analyzing the one or more masked images to obtain an image analysis of one or more parameters of the gas plume.

In certain embodiments, a tangible and non-transitory machine readable medium includes instructions to obtain one or more images including a gas plume from one or more cameras; focus the one or more images on an area of interest with an object detection model to generate a boundary box around the gas plume; focus the one or more images on the area of interest with a segmentation model to generate a mask around the gas plume based on the boundary box; obtain one or more masked images from the segmentation model; and analyze the one or more masked images to obtain an image analysis of one or more parameters of the gas plume.

The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 3 is a flow chart of a process for monitoring a facility with sensors (e.g., sensors and cameras), wherein the process analyzes images via a multi-model process in accordance with aspects of the present disclosure;

FIG. 5 is a flowchart of a process for performing an inspection of a gas plume, wherein the process analyzes images of the gas plume via a multi-model process to identify anomalies and/or a health condition of the equipment associated with the gas plume, in accordance with aspects of the present disclosure;

DETAILED DESCRIPTION

Figure 1:
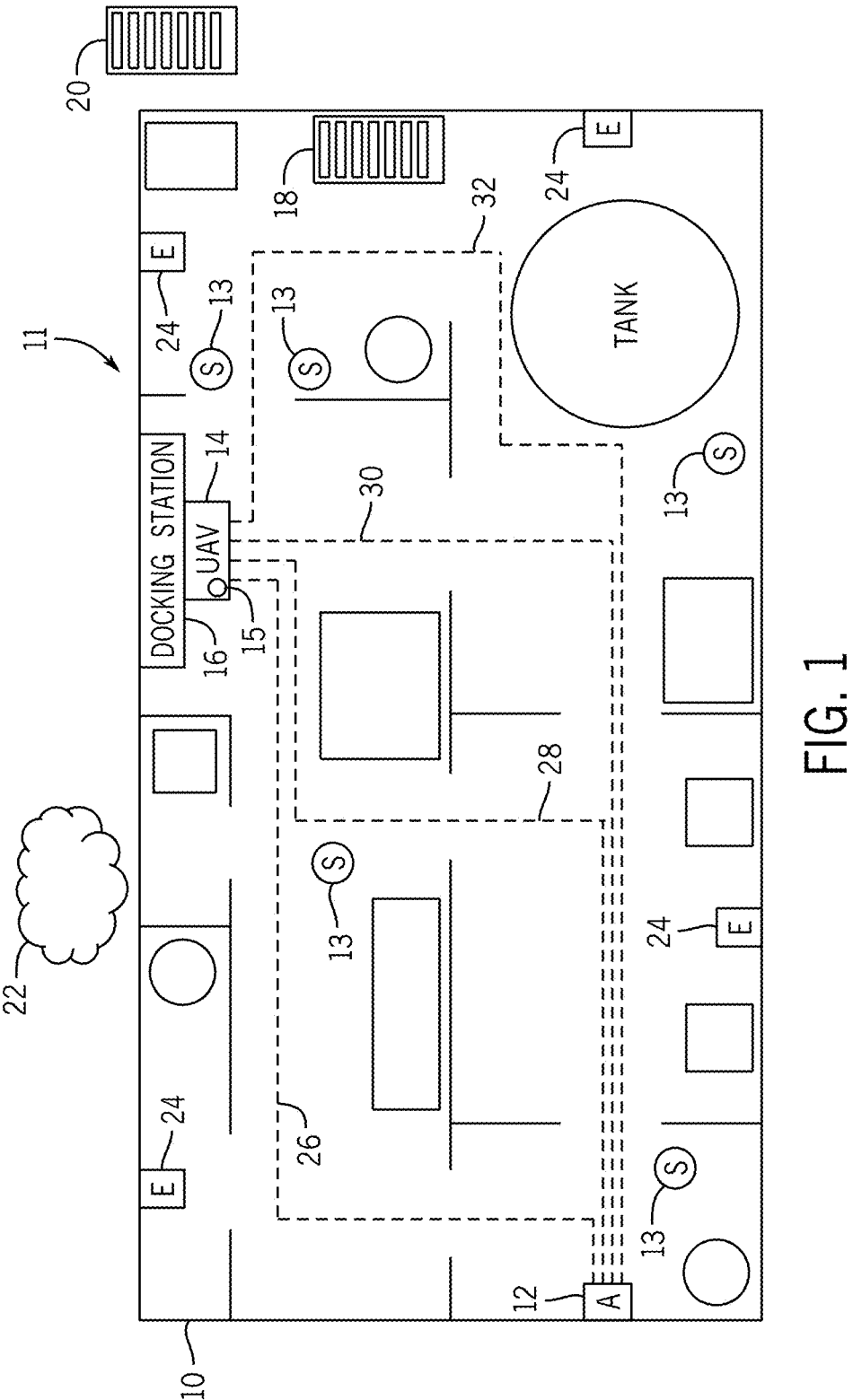
FIG. 1 is a schematic of a facility having fixed sensors and an unmanned autonomous vehicle (UAV) carrying sensors for inspecting one or more assets within the facility in accordance with aspects of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

This disclosure presents a systematic and automated workflow for efficiently detecting released gas clouds (i.e., plumes) and estimating their volume in the oil and gas facilities. It also offers a complete framework for keeping track of the estimated gas volume changes and temperature and performing condition-based monitoring (CBM) of assets with a designed gas release (e.g., compressor). Moreover, the computation engine can assign different following best actions depending on cases such as unusual hot air volume from an exhaust or sudden release of fugitive gas in the facility. Three potential use cases of the invention are (1) detecting fugitive (unexpected) gas leaks from an unknown (a priori) location in the facility, (2) identifying potential gas leaks from vulnerable locations in the facility, and (3) CBM for the asset's optimal maintenance throughout its life cycle. The presented workflow can be applied to other use cases for fire and smoke detection. The invention has several major components, including hardware, a software model, and a computational architecture, that are utilized to detect released gas clouds and estimate their volume.

The hardware is used for data collection purposes. Two main types of hardware that are needed are a robot and different cameras as payloads (e.g., RGB and IR). One may choose to go by the fixed sensor only (i.e., fixed camera), hybrid solution (fixed sensor+robot conveyed sensor), or robot conveyed sensor only. For all three cases, the same software model and computation architecture can be used because the solution is agnostic to the data source. However, some use cases may differ because each architecture has its own specifications. The purpose of the robot, such as a four-legged robot used for data collection or drone, is to automatically carry different visual cameras (that are specifically built for visualizing each gas) to the inspection point and send the captured images (and videos) to the computation architecture (explained herein) for analysis. However, if other fixed cameras exist in the facility, they can be used the same way in the solution. Additionally, for each specific gas/task, a particular camera is required. For example, thermal IR cameras are needed for thermal inspection, while the OGI camera may be used for visualizing the methane plume.

Object detection (e.g., YOLO) and segmentation (e.g., SAM) software models may also be utilized sequentially to identify and segment the gas plume. YOLO is a fast and accurate object detection model that detects and localizes objects (e.g., smoke). SAM is a segmentation model that has been trained on millions of images containing billions of objects, so it may identify what an object is in general but does not know what each segmented object is specifically. The model outputs a mask (a Boolean matrix equivalent of the image) for the detected plume. The mask is an essential part of condition-based monitoring (CBM) for cases where the gas release is a part of the process. It will be the base for calculating the gas volume and temperature distributions, which then will be inputs of the equipment populated head model (PHM).

A cloud-based or edge-based computation and visualization architecture may be used as a place to store the raw and processed data and an engine to run the models. Besides these tasks, it performs more in-depth analyses and enables the operators to do a root/cause analysis in case needed. Moreover, the computation architecture can trigger or modify the robot's routine inspection schedule on demand based on the insights and recommendations obtained from analyzing the other data streams and models from the facility. The additional data used for such recommendations may or may not have been generated by the robot. They can be part of a broader data collection and analysis system that work together to optimize the whole process. This architecture can be cloud-based or have components that operate locally depending on internet bandwidth.

FIG. 1 is a schematic of a facility 10 having various sensors 11 to monitor assets 12, wherein the sensors 11 include fixed sensors 13 (e.g., stationary sensors) and sensors 15 (e.g., mobile sensors) disposed on one or more unmanned autonomous vehicle (UAV) 14. Additionally, as discussed in detail below, one or more computer models and/or artificial intelligence (AI) are used to improve the efficiency of monitoring the facility 10, including guiding navigation of the UAV 14 to any anomalies (e.g., leaks, sounds, lights, etc.) for further inspection of the assets 12, analyzing images from the sensors 11 (e.g., cameras) to focus on an area of interest (AOI) (e.g., a masked image) via an object detection model (e.g., YOLO model) and a segmentation model (e.g., SAM), and analyzing the masked image to obtain information used for controlling the assets 12 in the facility 10. For example, as discussed in detail below, the images may include RGB images, thermal images, and/or optical gas images of the assets 12, and the analysis of the masked image provides information about the assets 12 that can be used for condition based monitoring and control of the assets 12 in the facility 10. In certain embodiments, the analysis of the masked image may provide a thermal analysis that identifies one or more thermal characteristics of the assets 12, such as an average temperature, a maximum temperature, a minimum temperature, a temperature distribution, a temperature at one or more critical locations, and thermal trends over time. Various aspects of the object detection model (e.g., YOLO model) and the segmentation model (e.g., SAM) are discussed in further detail below.

The facility 10 may be an industrial facility, such as a manufacturing facility, an oil and gas drilling and/or extraction facility (e.g., on-shore or off-shore), an oil, gas, or produced water processing facility, a mine, a lab, a refinery, a waste processing center, a water treatment plant, a lumber mill, a machine shop, a wind turbine, etc. In other embodiments, the facility 10 may be a commercial facility, such as an office, a hospital or other medical facility, a restaurant, a retail store, a hotel, a gym, an events venue, a ship, etc. In further embodiments, the facility 10 may be residential facility, such as a house, an apartment building, etc. The facility 10 may also be a public facility such as a school, a government office building, a courthouse, a library, an airport, a train station, a bridge, a highway, etc. The facility 10 may be entirely indoors, entirely outdoors, or have a mix of indoor and outdoor spaces. Similarly, the facility 10 may be on land, in the air, on the water, under water, and so forth.

The facility 10 may include one or more assets 12. The assets 12 may include, for example, pieces of equipment, inventory, raw materials, doors, windows, human workers, robots, computing and/or networking equipment. For example, the equipment may include manufacturing and automation equipment, chemical processing and refinery equipment, fluid handling equipment, or any combination thereof. By further example, the equipment may include combustion engines, furnaces, boilers, reactors, pumps, compressors, mixers, valves, vessels, separators, thermal equipment (e.g., heating, ventilation, and air conditioning (HVAC) systems, heat exchangers, heaters, coolers, etc.), radio frequency identification (RFID) tags, security systems, and so forth. Thus, a variety of the equipment may be fluid containing equipment that can discharge a plume (e.g., gas plume), either intentionally in a controlled manner or unintentionally as an unexpected leak. The disclosed embodiments help to monitor for various leaks and/or plumes using computer models and artificial intelligence (AI) associated with both the fixed sensors 13 and the sensors 15 carried by the UAV 14. In certain embodiments, a variety of the equipment may be thermally variable equipment that generates heat due to moving parts (e.g., rotor, shaft, piston, gears, impellers, turbine, valve, bearings, etc.), experiences heat due to a fluid flow, experiences heat due to a chemical reaction, or any combination thereof. Accordingly, the disclosed embodiments help to monitor for various conditions (e.g., thermal conditions) at the assets 12 using computer models and artificial intelligence (AI) associated with the sensors 11 (e.g., 13 and 15) having one or more cameras (e.g., RGB cameras, thermal cameras, and/or optical gas cameras).

The assets 12 may be periodically inspected by one or more UAVs 14 having one or more sensors 15. Inspection and/or calibration may be performed on a set schedule (e.g., as defined by policies set forth by the entity that manages the facility, local, state, or federal law or regulation, standard setting organization guidelines, industry best practices, a machine learning-based algorithm, etc.), after a set number of cycles, on demand, in response to some triggering event, upon anomalous data being collected, etc. In some embodiments, if the asset 12 is or includes a measurement device, the inspection by the UAV 14 may include calibration of the measurement device. In some embodiments, the UAV 14 may adjust and/or control some aspect of the asset 12 based on sensor feedback acquired by the sensors 15 of the UAV 14 and/or the fixed sensors 13. For example, the sensors 11 (e.g. 13 and/or 15) may detect an unexpected leak and/or an unexpected thermal condition (e.g., average temperature, minimum temperature, maximum temperature, temperature profile, etc.), and the UAV 14 may close a valve, shutdown a pump or compressor, or otherwise reduce or eliminate the leak and/or thermal condition by one or more control actions.

The sensors 11 (e.g., 13 and 15) may include gas sensors, temperature sensors, pressure sensors, humidity sensors, flow sensors, flow meters, flame sensors, liquid sensors, vibration sensors, accelerometers, motion sensors, audio sensors (e.g., microphones), light sensors, wind sensors (e.g., anemometers), cameras, and so forth. In certain embodiments as discussed in detail below, the sensors 11 (e.g., 13 and 15) include one or more cameras, such as RGB cameras, thermal cameras, and gas imaging cameras, which are used in association with computer models (e.g., object detection and segmentation models). The cameras may be used alone or in combination with additional sensors to obtain additional feedback about the assets 12. For example, in some embodiments, the sensors 11 may include one or more gas sensors configured to detect when certain gases, vapors, fluids, or particulates are present in the air at the facility 10. For example, the gas sensors may be configured to detect a combustible gas (e.g., natural gas, methane, hydrogen, syngas, etc.), an acid gas (e.g., hydrogen sulfide, carbon dioxide, etc.), carbon monoxide, and so forth, the presence of which may be indicative of a leak, a spill, a fire, insufficient venting, and so forth. In some embodiments, the sensors 11 may be permanently installed at the facility 10 as the fixed sensors 13 and/or the sensors 15 carried by the UAV 14. For example, the fixed sensors 13 may be installed at a plurality of fixed positions around the facility 10 for permanent use. This may be advantageous for use in standard operations for the facility 10. In other embodiments, the fixed sensors 13 may be temporary. For example, temporary fixed sensors 13 may be set up in areas of construction. In yet other embodiments, the fixed sensors 13 may be a combination of temporary and permanent. For example, there may be temporary fixed sensors 13 installed in addition to permanent fixed sensors 13 during plant turnarounds or during construction. The fixed sensors 13 may work in conjunction with the sensors 15 carried by the UAV 14 to assist with its inspections. Similar to the fixed sensors 13, the UAV 14 may be permanently installed at the facility 10 via a docking station 16 and/or temporarily deployed at the facility 10 with or without the docking station 16.

The UAV 14 may be land-based, air-based, or liquid-based (e.g., water-based, either surface-based or sub-surface-based). Accordingly, the UAV 14 may be a robot, a rover, an aerial drone, a remotely operated underwater vehicle (ROUV), a water surface drone, and the like. In certain embodiments, the UAV 14 may be a robot having 2, 3, 4 or more legs to walk around the facility 10, a ground vehicle having 2, 3, 4, or more wheels to drive around the facility 10, an aerial drone having one or more propellers, or a combination thereof. In some embodiments, the facility 10 may include a plurality of the UAVs 14 at the same or different locations around the facility 10, wherein the UAVs 14 may work together to provide monitoring of the facility 10.

As described in more detail below, the UAV 14 may dock at a docking station 16 when not in use. The docking station 16 may provide power to the UAV 14 (e.g., charging batteries), communicate with the UAV 14 (e.g., provide routes or other mapping data for download), and perform various other functions via the docking station 16.

As shown, the UAV 14 and/or the docking station 16 may be in communication with a local server 18 located at the facility 10, a remote server 20 disposed at a remote location relative to the facility 10, a cloud 22 (e.g., a public and/or private distributed computing architecture configured to provide storage and/or computing resources via one or more cloud-based computing devices), and/or one or more edge devices 24 (e.g., routers, switches, gateway devices, internet of things (IoT) devices, or other devices connected to a network that have computing capabilities) located at the facility 10. As discussed in more detail below, the UAV 14 may receive route data and/or traffic data from the local server 18, the remote server 20, the cloud 22, and/or the one or more edge devices 24, either directly or via the docking station 16. The route data may be based on satellite images, maps of the facility 10, data collected from fixed sensors 13 at the facility 10, and so forth. Further, in some embodiments, the UAV 14 may transmit requests for, and receive data regarding alternative routes, updated route information that takes one or more sensed items into consideration, and so forth. In certain embodiments, one or more computer models and/or AI may be stored and executed locally on the UAV 14, the local server 18, the remote server 20, the cloud 22, and/or the edge devices 24 to enable intelligent navigation of the UAV 14 to an anomaly, such as a gas leak in the facility 10.

Typically, when performing a routine or scheduled inspection, the UAV 14 receives a pre-programmed and approved route or series of waypoints that includes one or more inspection stops. The UAV 14 departs at a scheduled time, travels the route or follows the waypoints, performs the one or more inspections via the sensors 15, returns collected data, and returns to the docking station 16 or other route end location. In some cases, an asset 12 may generate an alert indicative of the asset 12 or an area around the asset 12 experiencing an anomaly (e.g., condition or problem), such as a fire, a chemical leak/spill, a gas leak, equipment failure, abnormal behavior, a health condition being below a threshold health level, etc. In such cases, an inspection of the asset 12 may be requested on short notice to assess the anomaly and determine a plan of action to address the condition or problem. In other embodiments, the inspection may be an unplanned inspection, an unscheduled inspection, an emergency inspection, a real-time generated inspection (or something along these lines), an alert/alarm triggered inspection, or control system triggered inspection (e.g., based on various sensors data and/or facility conditions indicating a potential real-time problem). However, in some cases a previously generated route from the UAV's 14 current location to the asset 12 to be inspected may not exist. Further, even if a route from the UAV's 14 current location to the asset to be inspected does exist, the route may be planned for a different time of day when traffic from other UAVs, vehicles, humans, wildlife, etc. may be different. Further, obstructions along the route, such as doors being open or closed, etc. may vary dependent upon the time of day.

Accordingly, in certain embodiments, one or more computer models and/or AI may generate a navigation route (e.g., route data) to the anomaly in real-time via intelligent navigation at the UAV 14, the docking station 16, the local server 18, the remote server 20, the cloud 22, and/or the one or more edge devices 24. For example, the one or more computer models and/or AI may generate the navigation route in real-time based on an evaluation of available sensor data from the fixed sensors 13 and the sensors 15 on the UAV 14, operating data (e.g., real-time data, historical data, service/maintenance data, etc.) of various assets 12 at the facility 10, various events (e.g., servicing of certain assets 12) at the facility 10, weather conditions, and any known blockages of areas in the facility 10. The route data may include, for example, multiple route options (e.g., route A 26, route B 28, route C 30, and route D 32), a suggested route of the available options, and/or available traffic data indicative of known routes being traveled by other UAVs at the time, or trends in traffic by humans, vehicles, wildlife, etc. at that time. In certain embodiments, the one or more computer models and/or AI may prompt a user to select a route (e.g., route A 26) from the available routes (e.g., route A 26, route B 28, route C 30, and route D 32), which may or may not be the suggested route, and depart along route A 26 toward the asset 12 upon selection by the user. In certain embodiments, the one or more computer models and/or AI may automatically select the route and proceed with navigation of the UAV 14 to the anomaly for further inspection. Again, the one or more computer models and/or AI may be partially or entirely executed on the UAV 14, the docking station 16, the local server 18, the remote server 20, the cloud 22, and/or the one or more edge devices 24, and thus any remote processing performed away from the UAV 14 may further include transmission of data (e.g., sensor data, route data, etc.) to and from the UAV 14 and the other computing devices (e.g., 16, 18, 20, 22, and/or 24).

As the UAV 14 travels along route A 26, the UAV 14 may utilize one or more onboard sensors 15 (e.g., proximity sensors, laser, sonar, camera, a red, blue, green, depth (RGB-D) camera, etc.) to identify unexpected obstructions along the route, such as other UAVs, humans, wildlife, vehicles, cleaning equipment, closed doors, fire, etc. If the UAV 14 encounters such an obstruction, the UAV 14 may stop in its place or identify a place to stop, and transmit a request for assistance to a nearby edge device 24, the docking station 16, the local server 18, the remote server 20, and/or the cloud 22. For example, if the UAV 14 requests help from a nearby edge device 24, the UAV 14 may transmit route data, which may be the same route data received before commencement of the mission, or a subset of the data received before commencement of the mission, to the edge device 24, along with data collected by the UAV 14 associated with the unexpected obstruction. This data may include, for example, video data, sonar data, and so forth. The edge device 24 may analyze the received data and suggest an alternative route (e.g., route B 28), or suggest that the UAV 14 continue along the planned route (e.g., route A 26). If the UAV 14 chooses to default to an alternative route (e.g., route B 28), the UAV 14 may determine how to get to the alternative route (e.g., route B 28) and then proceed along that path. For example, in the embodiment shown in FIG. 1, the UAV 14 may backtrack along route A 26 until it reaches route B 28 and then follow route B 28 to the asset 12. However, in some embodiments, the recognition of the obstruction and decision to default to an alternative route may be made entirely onboard the UAV 14 via the one or more computer models and/or AI. The UAV 14 may also use onboard sensors 15 to detect fire smoke, leaks, chemical spills, wildlife, authorized people, etc. The UAV 14 may use the one or more computer models and/or AI to evaluate any obstructions and/or issues affecting the navigation route, and automatically change the navigation route to reach the anomaly based on one or more factors (e.g., minimal time based on an urgency of the anomaly, minimal risk based on various hazards, minimal obstacles, etc.). In some embodiments, each obstruction and/or issue affecting the navigation route may prompt the one or more computer models and/or AI to present multiple route options to a user for a user to make a selection of the alternative route. In certain embodiments, the UAV 14 may use the one or more computer models and/or AI to automatically adjust the navigation route in real-time without any stops and/or with minimal stops, thereby reducing the time of arrival of the UAV 14 at the anomaly.

Once the UAV 14 arrives at the asset 12, the UAV performs the inspection of the anomaly via one or more sensors 11 (e.g., 13 and 15). The inspection may include at least imaging by one or more cameras (e.g., RGB cameras, thermal cameras, and/or optical gas imaging (OGI) cameras) by the sensors 11, analysis of images from the cameras by computer models (e.g., object detection and segmentation models) to obtain masked images, and analysis of the masked images to obtain asset conditions (e.g., thermal conditions) of the asset 12. The asset conditions may indicate a health condition of the asset 12, including thermal conditions such as an average temperature, a minimum temperature, a maximum temperature, a temperature at critical locations, a temperature trend over time, or any combination thereof. Thus, the image analysis helps provide useful information about the asset 12, which can be used alone or in combination with other sensor feedback. In some embodiments, the UAV 14 may utilize onboard sensors 15 (e.g., tactile, chemical (e.g., gas/vapor sensors), ultrasound, temperature, laser, sonar, cameras, etc.) to inspect the anomaly at the asset 12. For example, the inspection may include a leak inspection and/or gas plume inspection via gas sensors, wind sensors, and/or cameras. By further example, the inspection may include an analysis of a flow rate, a gas concentration, a leak location, or any combination thereof, of a gas leak and/or gas plume. In certain embodiments, the inspection may include an inspection of the leak location, including a size of the leak (e.g., cross-sectional area of a crack), an identity of a particular part having the leak (e.g., a flange, a valve body, a seal, a pump, a compressor, etc.), or any combination thereof. The inspection may include, for example, checking connections, tag numbers on cables and/or sensors, grounding, checking for abnormal readings (e.g., current, voltage, power, etc.), lack of power, lack of signal, signs of damage, etc. In some embodiments, the UAV 14 may be configured to communicatively couple to the asset 12 (e.g., via a wireless network connection, a wired network connection, cellular data service, Bluetooth, Near Field Communication (NFC), ZigBee, ANT+, LoRaWan, Z-wave, or some other communication protocol) and collect data from the asset 12. In some embodiments, collected data may be transmitted to the docking station 16, the local server 18, the remote server 20, the cloud 22, and/or the one or more edge devices 24 while the UAV 14 is in the presence of the asset 12. However, in other embodiments, the UAV 14 may wait to transmit collected data until the UAV 14 has returned to the docking station 16 or otherwise completed the mission and reached the end of its route. In some embodiments, the UAV 14 may flag the asset 12 for human attention (e.g., service, maintenance, etc.). In some embodiments, the UAV 14 may adjust and/or control one or more aspects of the asset 12 and/or related assets 12 in the facility 10 to reduce or eliminate the anomaly (e.g., gas leak), such as by closing a valve, shutting down a pump or compressor, diverting a fluid flow around the asset 12, or any combination thereof.

Once the inspection of the asset 12 is complete, the UAV 14 travels along a determined route back to the docking station 16, to the end of the planned route, or to another asset 12 for inspection. As previously discussed, as the UAV 14 travels the route, the UAV 14 may use onboard sensors 15 (e.g., proximity sensors, laser, sonar, camera, an RGB-D camera, etc.) to identify unexpected obstructions along the route, such as other UAVs, humans, wildlife, vehicles, cleaning equipment, closed doors, etc. In other embodiments satellite images, or images received from other devices may be used to identify obstructions. If such obstructions are encountered, the UAV 14 may request the assistance of a nearby edge device 24 (e.g., e.g., routers, switches, gateway devices, internet of things (IoT) devices, or other devices connected to a network that have computing capabilities), the docking station 16, the local server 18, the remote server 20, and/or the cloud 22, or the UAV 14 may identify an alternative route on its own and follow the alternative route to the next asset or to the end of the route and conclude its mission.

Figure 2:
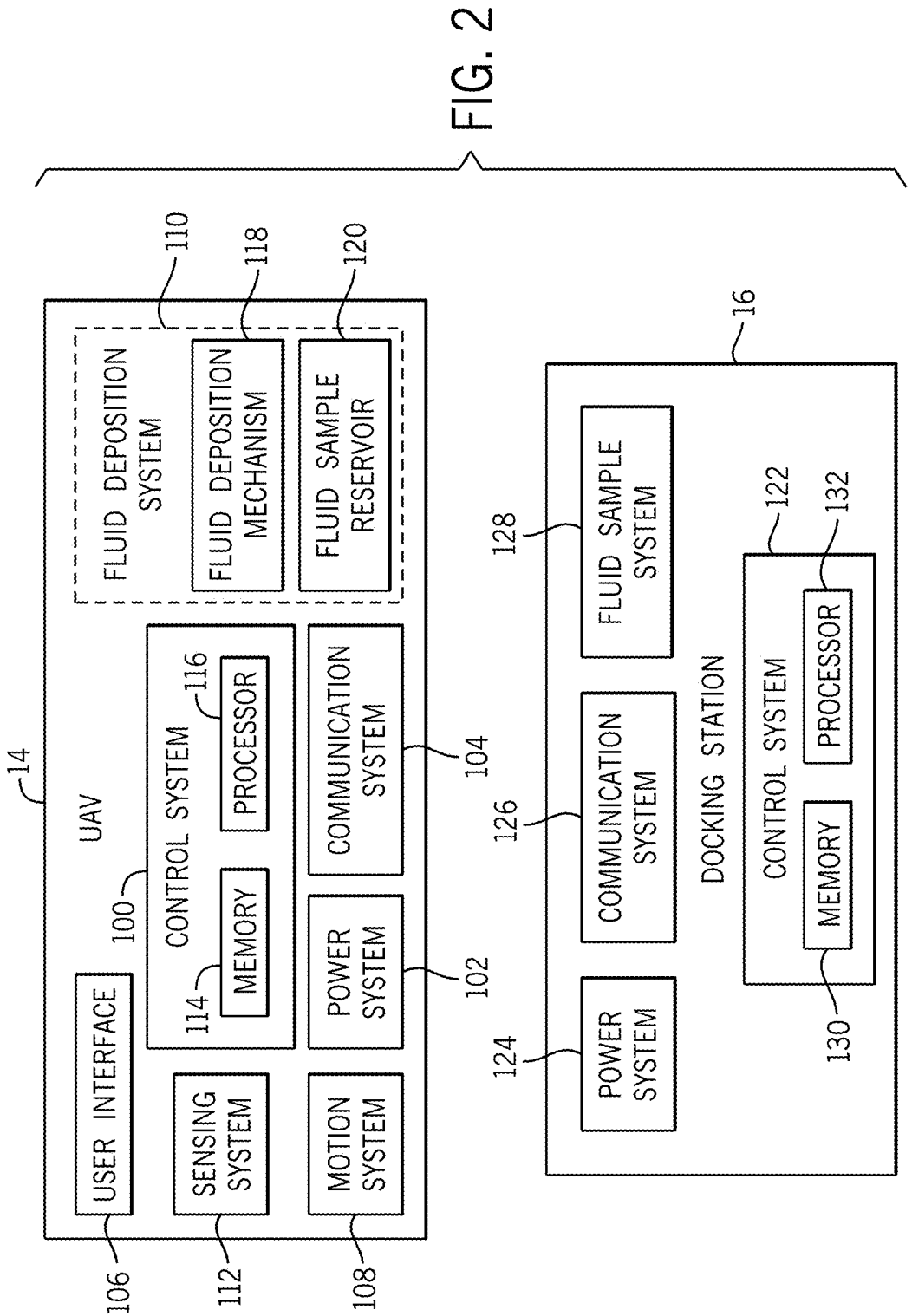
FIG. 2 is a schematic view of the UAV of FIG. 1 and a UAV docking station in accordance with aspects of the present disclosure.

FIG. 2 is a schematic view of the UAV 14 and the docking station 16 of FIG. 1. As shown, the UAV 14 includes a control system 100, a power system 102, a communication system 104, a user interface 106, a motion system 108, a fluid deposition system 110, and a sensing system 112. The sensing system 112 includes one or more of the sensors 15 of FIG. 1. As noted above, the UAV 14 may use one or more computer models and/or AI to improve the efficiency of navigating and monitoring the facility 10, wherein the one or more computer models and/or AI may be disposed on the UAV 14 and/or other computing devices (e.g., 16, 18, 20, 22, and/or 24). As discussed in detail below, the UAV 14 may use the sensors 15 (e.g., cameras) to obtain images, which can be analyzed with computer models (e.g., object detection and segmentation models) to obtain a masked image of an asset 12. The masked image can then be analyzed to identify a health condition.

The control system 100 may include one or more memory components 114 and one or more processors 116 and be configured to control various aspects of the UAV 14, including the various systems shown in FIG. 2 (e.g., the power system 102, the communication system 104, the user interface 106, the motion system 108, the fluid deposition system 110, and/or the sensing system 112). In some embodiments, one or more of the systems of the UAV 14 shown in FIG. 2 may also include control components, including a memory 114 and a processor 116, to control some or all of the operations of the respective system. For example, the control system 100 may act in concert with the motion system 108 to receive a signal from the one or more sensors (e.g., encoders) of the motion system 108 and output a control signal to the one or more motors or movement actuators to control the movement of the UAV 14. Similarly, the control system 100 may coordinate with the sensing system 112 to receive data from the sensing system 112 (e.g., sensors 15) and process or analyze the collected data and determine what action to take next. In further embodiments, the UAV 14 may transmit data to the local server, the remote server, the cloud, and/or one of the edge devices via the communication system 104. In some embodiments, the control system 100 may also perform mission planning tasks, such as navigating to a location, deciding what action to take next, and then executing the next action by coordinating the various other components of the UAV 14 with assistance by the one or more computer models and/or AI.

In some embodiments, the control system 100 may perform navigation and mission planning tasks with assistance by the one or more computer models and/or AI. For example, the control system 100 may receive route data indicating one or more possible routes for a mission. In some embodiments, the route data may also include data representing traffic trends along the possible routes. The control system 100 may be configured to select a route and then control the motion system 108 to navigate the UAV 14 along the selected route. Further, the control system 100 may receive data from the sensing system 112 indicating various aspects of the environment around the UAV 14 and control the motion system 108 to navigate the UAV 14 around one or more obstacles or obstructions detected. Further, the control system 100 may, on its own or with the assistance of another device, identify that a route is obstructed or otherwise impassable, identify and select an alternative route, and use the motion system 108 to navigate the UAV along the route.

The power system 102 may be configured to provide power for various operations of the UAV 14. Accordingly, the power system 102 may include a replaceable or rechargeable battery, a combustion engine, a generator, an electric motor, a solar panel, a chemical-reaction-based power generation system, etc., or some combination thereof. In some embodiments, the power system 102 may be configured to draw power from the docking station 16 in the form of recharging batteries, taking on fuel or other fluids, and so forth.

The communication system 104 may be configured to communicate with devices disposed within the facility (e.g., the docking station 16, the local server, one or more edge devices, one or more assets, a remote controller, a smart phone, a computing device, a tablet, etc.), as well as devices that may be outside of the facility, such as the remote server, the cloud. For example, the communication system 104 may enable communication via a wireless network connection, a wired network connection, cellular data service, Bluetooth, NFC, ZigBee, ANT+, LoRaWan, Z-wave, or some other communication protocol. In some embodiments, the communication system 104 may be configured to encrypt some or all of the data it sends out and decrypt some or all of the data it receives.

The user interface 106 may be configured to receive input from a user configuring or adjusting various settings of the UAV 14. The user interface 106 may include one or more input devices (e.g., knobs, buttons, switches, dials, etc.) and in some cases may include an electronic display (e.g., a screen, array of LEDs, etc.) for providing feedback to the operator. In other embodiments, the UAV 14 may be configured by a separate off-board device (e.g., a remote control, a mobile device, a tablet, etc.) that acts as a user interface 106.

The motion system 108 actuates movement of the UAV 14 on the ground, through the air, through a liquid (e.g., water), along a surface of liquid, or some combination thereof. The motion system 108 may include one or more motors and, in some embodiments, one or more encoders. The motors may drive propellers, legs, wheels, tracks, wings, fins, etc. The encoders may sense one or more parameters of the motors (e.g., rotational speed) and provide data to a control system 100 or a controller within the motion system 108 to generate a control signal to control operation of the motors.

The fluid deposition system 110 may be configured to store fluid samples and emit the fluid samples during sensor inspection. As shown in FIG. 2, the fluid deposition system 110 may include a fluid deposition mechanism 118 and a fluid reservoir 120. The fluid reservoir 120 may be configured to store one or more samples of fluid to be emitted during sensor inspection. The fluid samples may be received via the docking station 16, a fluid sample refill station, or may be manually provided periodically by an operator.

The sensing system 112 may include one or more sensors 15 (e.g., tactile, chemical (e.g., gas/vapor sensors), ultrasound, temperature, laser, sonar, cameras, etc.) configured to sense various qualities and collect data corresponding to the area around the UAV 14. As noted above, the cameras may include one or more RGB cameras, thermal cameras, optical gas imaging cameras, or any combination thereof. The images acquired by the cameras of the UAV 14 may be used alone or in combination with images acquired by the fixed sensors 13. The sensors may be used during inspection of assets, for navigation of the UAV 14 through the facility, and so forth.

The UAV 14 may be configured to return to and connect to the docking station 16 when the UAV 14 is not in use. The docking station 16 may include a control system 122, a power system 124, a communication system 126, and a fluid sample system 128. The control system 122 may be configured to control operations of the docking station 16, including the various systems shown in FIG. 2 (e.g., the power system 124, the communication system 126, and the fluid sample system 128) and perform various tasks associated with the UAV 14. The control system 122 may include a memory component 130 and one or more processors 132. In some embodiments, the control system 122 may be configured to receive instructions and/or plans for the UAV 14 via the communication system 126, store the instructions and/or plans in the memory 130 and provide them to the UAV 14 for implementation. Correspondingly, the control system 122 may also receive data from the UAV 14 and pass data to a local or remote computing device (e.g., the local server, the remote server, the cloud, and/or the one or more edge devices) via the communication system 126.

The power system 124 may contain an internal source of power, such as a generator or battery, and/or be connected to external power, such as a utility grid (e.g., by being plugged into a power outlet), a generator, a battery, etc. Accordingly, the power system 124 may be configured to draw power from the internal or external source of power, in some cases store that power, use the power to run the docking station 16, and also provide power to the UAV 14 (e.g., via the UAV 14 power system 102). Accordingly, the power system 124 may charge the UAV's 14 batteries, provide fuel to the UAV 14, and so forth.

The communication system 126 may include communication circuitry configured to establish a wired or wireless connection with the communication system 104 of the UAV 14. For example, the connection may be a wireless network connection, a wired network connection, a cellular data connection, a Bluetooth connection, an NFC connection, a ZigBee connection, an ANT+ connection, a LoRaWan connection, a Z-wave connection, or a connection via some other communication protocol. The communication system 126 may be configured to receive data from the communication system 104 of the UAV 14 while the UAV is docked and/or when the UAV 14 is deployed out in the facility performing inspections or other tasks. The exchanged data may be related to an inspection of assets, mission planning, navigation, power supply, fluid sample supply, threat detection, obstruction detection, and so forth. Further, in some embodiments, the communication system 126 may be configured to communicate with a local or remote computing device via a wireless network connection, a wired network connection, a cellular data connection, a Bluetooth connection, an NFC connection, a ZigBee connection, an ANT+ connection, a LoRaWan connection, a Z-wave connection, or a connection via some other communication protocol. The local or remote computing device may be a desktop computer, a laptop computer, a mobile device, a tablet, a remote controller, a server, an edge device, a cloud-based computing device, etc. In such embodiments, the communication system 126 may be configured to provide and/or receive data regarding the operation of the UAV 14 to the local or remote computing device. For example, the local or remote computing device may be used by an operator to control the UAV 14, either directly, or via the docking station 16.

The fluid sample system 128 may maintain one or more reservoirs of fluid samples and provide fluid samples to the UAV 14 to emit during sensor inspection. In some embodiments, the fluid sample system 128 may store large quantities of the fluid sample materials and use a pump or some other actuator to provide fluid samples to the UAV 14. In such embodiments, the fluid samples may be stored in a reservoir and pumped into the fluid sample reservoir 120 of the UAV 14. However, in other embodiments, the fluid samples may be pre-packaged and the fluid sample system 128 may include an actuator that provides the pre-packaged fluid samples to the fluid deposition system 110 of the UAV 14. In such embodiments, the fluid sample system 128 may also be configured to retrieve used fluid sample packaging from the UAV 14 after the fluid samples have been emitted. The fluid samples may include a plurality of fluid samples disposed in respective sample containers, wherein the fluid samples may correspond to each of the gases being sensed by the various sensors 11.

It should be understood that the embodiments of the UAV 14 and docking station 16 shown and described with regard to FIG. 2 are merely examples and are not intended to limit the scope of the present application. As such, embodiments having different combinations of components are also envisaged. The embodiments discussed in detail below may be used with imaging data (e.g., RGB images, thermal images, optical gas imaging, etc.) acquired from another source, including any or all of the sensors 11 (e.g., 13 and 15).

FIG. 3 is a flow chart of an embodiment of a process 200 for monitoring assets 12 in a facility 10. The process 200 may be performed by one or more processor-based computing devices, including the control system 110 of the UAV 14, the control system 122 of the docking station 16, and other computing devices (e.g., 16, 18, 20, 22, and/or 24). In block 202, the process 200 operates the facility 10 having a plurality of equipment (e.g., assets 12). For example, the plurality of equipment may include pumps, compressors, valves, heat exchangers, tanks, mixers, engines, separators, fluid manifolds, pipes, machinery, and bed reactors.

In blocks 204 and 206, the process 200 may inspect the facility 10. In block 204, the process 200 obtains feedback from one or more fixed sensors and one or more fixed cameras. The fixed sensors and fixed cameras may be fixed at certain positions in the facility 10. For example, the fixed sensors and fixed cameras may be positioned such that the fixed sensors and fixed cameras monitor a particular piece of equipment and/or gas plumes. In block 206, the process 200 obtains feedback from one or more mobile sensors and one or more mobile cameras via the sensing system 112 of the UAV 14. The UAV 14 may be configured to obtain feedback from substantially the same position every time and/or different positions. The process 200 may inspect the facility 10 on a set schedule, after a set number of cycles, on demand, in response to some triggering event, or upon anomalous data being collected. In some embodiments, an anomaly in the inspection by mobile sensors and mobile cameras of the UAV 14 may trigger inspection by the fixed sensors and fixed cameras. Alternatively, an anomaly in the inspection by the fixed sensors and fixed cameras may trigger inspection by the mobile sensors and mobile cameras of the UAV 14. In certain embodiments, the fixed sensors and fixed cameras correspond to the fixed sensors 13 of FIG. 1, while the mobile sensors and mobile cameras correspond to the mobile sensors 15 of the UAV 14 of FIG. 1. Thus, any discussion of sensors 11 (e.g., 13 and 15) is intended to include various sensors and cameras, such as RGB cameras, thermal cameras, and optical gas imaging cameras.

In block 208, the process 200 focuses on an area of interest (AOI) of an object in the images (i.e., the feedback) from the cameras obtained in blocks 204 and/or 206 via a multi-model process. The object may include a particular piece of equipment, a gas plume, a human worker, a robot, a vessel, and so forth. The multi-model process may include analyzing the image using an object detection model and/or a segmentation model to focus on the AOI. The process 200 may use You Only Look Once (YOLO) as the object detection model. Additionally, the process 200 may use the Segment Anything Model (SAM) as the segmentation model. In particular, the process 200 may focus on the AOI using the multi-model process to remove unnecessary background information in the images from the camera, such as background vegetation, pipes, building structures, people, and the like. For example, the process 200 may ultimately focus on only a desired object (e.g., equipment or gas plume) and remove all other image information outside a boundary of that object, thereby producing a masked image of the object. The multi-model process is discussed in further detail below with reference to FIGS. 4-8.

In block 210, the process 200 analyzes the images from the cameras within the AOI (e.g., masked image) to obtain an image analysis of the object. The images may be RGB images, thermal images, and/or optical gas images. The process 200 may be configured to determine one or more parameters of the object based on the images. For example, the process 200 may analyze the thermal image of an equipment (e.g., tank, pump, compressor, valve, etc.) or gas plume to determine a temperature profile (e.g., a thermal map) of the equipment or gas plume. The thermal map may indicate temperature variations according to position (e.g., X, Y, and/or Z coordinates) of the equipment or gas plume. As another example, the process 200 may analyze the RGB image of the equipment or gas plume to determine the shape and size of the equipment or gas plume. By focusing on the AOI and removing unnecessary background information from the images, the process 200 may provide more useful information about the object (e.g., equipment or gas plume) when performing the image analysis in block 210. Thus, if temperatures vary in the background, then this temperature variation will be removed and not impact the image analysis of the object.

In block 212, the process 200 analyzes feedback from sensors to obtain sensor analysis of the object. The sensors may include feedback from the sensors 11 (e.g., 13 and/or 15), and may include any of the sensors and sensor feedback described herein. For example, the sensors may include gas sensors, temperature sensors, pressure sensors, humidity sensors, flow sensors, flow meters, flame sensors, liquid sensors, vibration sensors, accelerometers, motion sensors, light sensors, anemometers, and so forth. The process 200 may be configured to determine one or more parameters of the object (e.g., equipment or gas plume) or affecting the object based on the sensor feedback. For example, the process 200 may determine the pressure of the tank using a pressure sensor. As another example, the process 200 may determine the wind direction from the anemometer as affecting the gas plume. By further example, the process 200 may determine a gas concentration, a flow rate, a gas volume, or a combination thereof, of a gas leak or gas plume. By further example, the process 200 may determine a sound level (e.g., decibels), a vibration level, a flow rate of fluid, a speed of rotation, a position, or any combination thereof, of an equipment (e.g., valve, pump, compressor, engine, etc.).

In block 214, the process 200 evaluates the image analysis (block 210) and the sensor analysis (block 212) together to obtain an object analysis. As such, the process 200 may combine and verify the parameters of the object (e.g., equipment or gas plume) as determined in the image analysis and the sensor analysis to obtain the object analysis. For example, the object analysis may use the pressure determined in the sensor analysis and the temperature profile determined in the image analysis to calculate an approximate volume of gas inside the tank. As another example, the object analysis may use the wind direction determined in the sensor analysis and the shape of the gas plume determined in the image analysis to calculate an approximate area of the gas plume. By further example, the object analysis may use the sound level, the vibration level, the flow rate of fluid, and the speed of rotation of the equipment (e.g., pump, compressor, engine, etc.) of the sensor analysis in combination with the temperature profile (e.g., thermal map) of the equipment from the image analysis to analyze various aspects of the equipment (e.g., positions of bearings, seals, pistons, known hot spots, known areas for issues, etc.).

In block 216, the process 200 detects an anomaly based on the object analysis. The process 200 may use user inputs, historical data, computer models and/or artificial intelligence, operating specifications or any combination thereof, to determine which data points may constitute the anomaly. For example, the process 200 may determine a flowrate parameter constitutes the anomaly if the value of the flowrate parameter exceeds a user input flowrate. As another example, the process 200 may determine a temperature parameter constitutes the anomaly if the temperature parameter of a piece of equipment exceeds the temperature at which the piece of equipment can safely operate according to the equipment's operating specifications. For example, if a temperature at a particular location (e.g., bearing, seal, piston, etc.) is above a threshold temperature, then the temperature may indicate an anomaly at the particular location. By further example, if the temperature (e.g., average temperature and/or maximum temperature) exceeds a threshold in combination with a sound level and/or a vibration level above a threshold, then the object analysis may identify the anomaly as a worn or failing part (e.g., bearing, seal, piston rings, etc.). These analyses also may be part of an anomaly quantification and/or a root cause analysis as discussed in further detail below.

In block 218, the process 200 quantifies the anomaly based on a comparison with thresholds, historical data, computer models and artificial intelligence, or any combination thereof. As such, the process 200 may compare the anomaly to the thresholds, historical data, and/or computer models and artificial intelligence to determine the severity level of the anomaly. For example, if the anomaly constitutes an average temperature or a maximum temperature of the temperature profile of the object (e.g., equipment or gas plume) exceeding a threshold, the process 200 may calculate how much higher the average or maximum temperature is over the threshold and label the anomaly with an appropriate level of severity. The quantification of the anomaly may include the actual measurement value (e.g., average temperature, maximum temperature, or trend in rate of increasing temperature over time), a temperature over the threshold, a percentage over the threshold, or any combination thereof. As another example, if the anomaly is an unexpected gas leak, the process 200 may calculate or estimate the size of the hole causing the gas leak, the flow rate of the gas leak, the volume of the gas leak, or any combination thereof, based on a computer model simulating the leak. In certain embodiments, the quantification of the anomaly may include a score (e.g., a severity score) that indicates the severity of the anomaly on a scale (e.g., increasing severity from 1 to 10, 1 to 100, or the like). The score may be based on each sensor measurement accounted for in the object analysis, wherein certain sensor measurements may be weighted differently from others. For example, vibration feedback may be attributed a higher weight than sound feedback, temperature feedback may be attributed a higher weight than speed feedback, or the like.

In block 220, the process 200 performs one or more actions based on the anomaly. The process 200 may automatically perform the one or more actions upon detecting the anomaly. The actions may include outputting a notification and/or outputting a report describing the anomaly (block 222). The actions may also include executing a root cause analysis (block 230). The notification and/or report may contain the identification of the anomaly (block 216), information regarding the time the anomaly occurred, the location on a map of the facility 10, the location on a 3D model of the object (e.g., equipment or gas plume), the feedback from sensors (blocks 204, 206), the image of the object (e.g., RGB image, thermal image, and/or optical gas imaging) within the AOI (block 208), the image analysis (block 210), the sensor analysis (block 212), the object analysis (block 214), the quantification of the anomaly (block 218), and/or the results of the root cause analysis (block 230). The notification and/or report also may depict a graph or illustration of a trend in one or more parameters (e.g., temperature, pressure, flow rate, sound level, vibration level, etc.) over time, predicted future trends or events (e.g., part failure), and recommended remedial measures. The actions (block 220) may further include scheduling and executing an inspection via the sensors and/or cameras. The sensors and/or cameras may be the fixed sensors and fixed cameras (e.g., sensors 13) and/or the mobile sensors and mobile cameras (e.g., sensors 15) of the UAV 14. The process 200 may instruct the sensors and/or cameras to repeat the inspection of the facility 10 as in blocks 204 and/or 206. Alternatively, the process 200 may instruct the sensors and/or cameras to only repeat the inspection of the object. In certain embodiments, the inspection of block 224 may include different measurements not already taken in blocks 204 and 206, measurements from a different location, angle, or perspective relative to the anomaly, or any combination thereof. For example, if the UAV 14 used in block 206 was a ground based UAV 14, then the inspection of block 224 may deploy an aerial UAV 14 to obtain measurements (e.g., sensor feedback and/or camera images) from one or more locations above the anomaly. Additionally and/or alternatively, the process 200 may schedule a manual inspection and/or service of the object by a technician (block 226). In such embodiments, the process 200 may generate a safe route for the technician to reach the location of the anomaly (block 228), and include a map of the safe route in the notification and/or report (block 222). The actions (block 220) may also include adjusting one or more operating parameters of the facility 10 based on the anomaly (block 232). For example, the adjustments of block 232 may include adjusting a valve to reduce a flow rate, adjusting a pump or compressor to increase or decrease flow, adjusting feeds into a chemical reactor to adjust the chemical reaction, or any combination thereof. The adjustments of block 232 may include control of any of the equipment or assets 12 described herein to help reduce or eliminate the anomaly.

Figure 4:
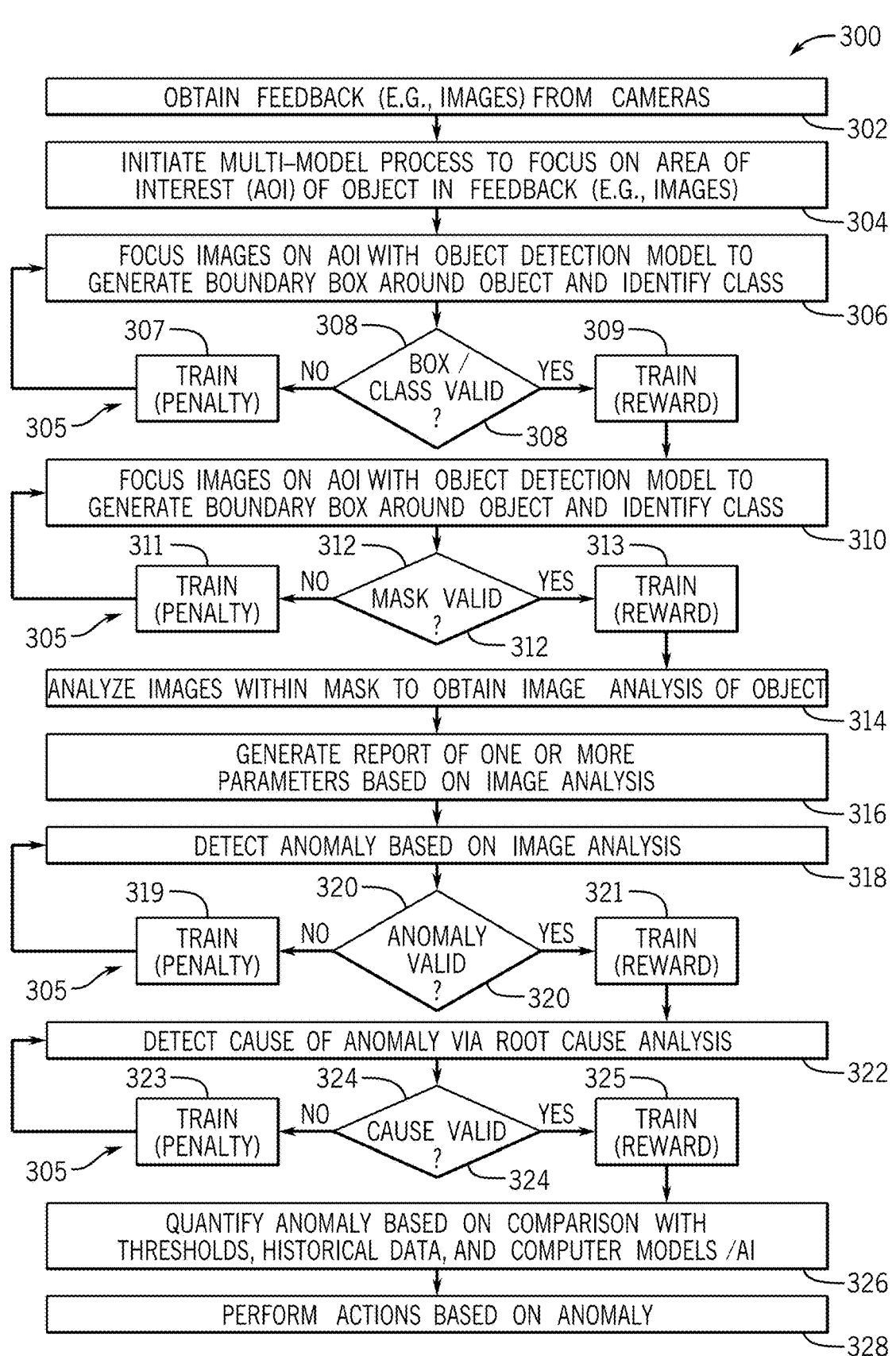
FIG. 4 is a flow chart of an embodiment of a multi-model process using object detection and segmentation models in accordance with aspects of the present disclosure.

FIG. 4 is a flow chart of an embodiment of a multi-model process 300 using the object detection model and the segmentation model of FIG. 3. The process 300 may be performed by one or more processor-based computing devices, including the control system 110 of the UAV 14, the control system 122 of the docking station 16, and other computing devices (e.g., 16, 18, 20, 22, and/or 24). In block 302, the process 300 obtains feedback (e.g., images) from one or more cameras. The images may be RGB images, thermal images, and/or optical gas images. In block 304, the process 300 initiates the multi-model process to focus the images on the AOI of the object as discussed above in block 208 of FIG. 3.

In block 306, the process 300 focuses the images on the AOI with the object detection model to generate a boundary box around the object (e.g., equipment or gas plume) and identify the class or classification of the object. The boundary box may be a rectangular or square boundary box, a circular or oval boundary box, a polygonal boundary box having 3, 4, 5, 6, or more sides, or any combination thereof. The boundary box may be fit to closely extend around the object. The object detection model used may be customized to the facility 10, including the objects (e.g., equipment and gas plumes) in the facility 10, the map of the facility and locations of the objects within the map, and various operations of the facility 10.

The process 300 may initiate a machine learning/AI training and validation process 305 for the object detection model by evaluating the boundary box and classification at block 308. If the boundary box and class is not valid at block 308, then the process 305 may proceed to train the object detection model by penalizing the machine learning/AI at block 307 and returning to block 306. If the boundary box and class is valid at block 308, then the process 305 may proceed to train the object detection model by rewarding the machine learning/AI at block 309 and proceeding to block 310. For example, the object detection model may be trained on images from the facility 10 or on images of objects similar to the objects used in the facility 10. In certain embodiments, the process 300 may use machine learning/AI to train the object detection model to identify the objects in the facility, such as types or classes of objects in various hierarchal levels. The hierarchical levels may include a first level of objects (e.g., equipment, gas plumes, buildings, etc.), a second level of objects (e.g., types of equipment, types of gas plumes, etc.), a third level of objects (e.g., make, model, etc. of the equipment), and so forth. For example, the types of equipment may include any of the assets or equipment described herein, including pumps, compressors, valves, engines, tanks, separators, reactors, and so forth. The training may involve using the machine learning/AI associated with the object detection model to evaluate a library of existing images when evaluating new images from the cameras. In certain embodiments, the training of the object detection model may be performed prior to deployment in the facility 10, during deployment in the facility 10, and/or whenever new objects are introduced into the facility 10. In some embodiments, the object detection model may be trained using a map (e.g., a two-dimensional and/or three-dimensional map) of the facility 10. For example, the object detection model may identify the object as a pump if the map shows the pump in the same area as the location of acquiring the image of the pump. By further example, the object detection model may identify the object as a gas plume if the map shows a known gas plume in the same area as the location of acquiring the image of the gas plume. The object detection model may be trained to identify the class of the object using user input, the data in the cloud 22, and/or references obtained from the internet.

In block 308, the process 305 uses machine learning/AI and/or user inputs to determine whether the boundary box is valid for the object. The boundary box may be considered valid if the entire object fits within the boundary box and the boundary box is closely tailored to fit the object. If the boundary box is valid, the machine learning/AI system is rewarded at block 309. If the boundary box is invalid, the machine learning/AI system is penalized at block 307. Similarly, in block 308, the process 305 determines whether the class of the object is valid. If the class of the object is valid, the machine learning/AI system is rewarded at block 309 but, if the class of the object is invalid, the machine learning/AI system is penalized at block 307. Thus, by rewarding the machine learning/AI system when it provides correct information and penalizing the machine learning/AI system when it provides incorrect information, the machine learning/AI system is trained to better generate the boundary box and identify the class of the object.

In block 310 of the multi-model process, the process 300 focuses the images on the AOI with the segmentation model to generate a mask around the object (e.g., equipment or gas plume) based on the boundary box. The segmentation model uses the boundary box to better determine the object's boundary. In other words, the object detection model guides, focuses, or enhances operation of the segmentation model by providing a first level of focus on the AOI in the image. The output of the segmentation model is a masked image that is further focused on the object within the boundary box. In some embodiments, a user may provide a center point of the object to the segmentation model. The segmentation model may use the center point to better determine the object's boundary.

The process 300 may initiate the machine learning/AI training and validation process 305 for the segmentation model by evaluating the image mask (e.g., masked image of the object) at block 312. If the image mask is not valid at block 312, then the process 305 may proceed to train the segmentation model by penalizing the machine learning/AI at block 311 and returning to block 310. If the image mask is valid at block 312, then the process 305 may proceed to train the segmentation model by rewarding the machine learning/AI at block 313 and proceeding to block 314. In block 312, the process 305 uses machine learning/AI, a library of images, and/or user inputs to determine whether the image mask is valid. The image mask may be considered valid if the image mask includes only the object and includes the object in its entirety. For example, if the image mask has a boundary directly fit around an upper half of a pump but misses a lower half of the pump, then the image mask would be invalid. The validation may occur automatically without user intervention and/or with user input to accept the image mask as valid or reject the image mask as invalid. If the image mask is valid, the machine learning/AI system is rewarded at block 313. If the mask is invalid, the machine learning/AI system is penalized at block 311.

In block 314, the process 300 analyzes the images within the mask to obtain an image analysis of the object (e.g., equipment or gas plume). The image analysis may include determining one or more parameters of the object based on the images. Thus, in block 316, the process 300 may generate a report of the one or more parameters of the object based on the image analysis. The report may be similar to the notification and/or report of block 222 of FIG. 3. Advantageously, the image analysis only analyses details of the image corresponding to the object, and specifically excludes irrelevant background information (e.g., trees, buildings, grass, people, etc.). Thus, the image analysis is generally more accurate by providing statistical information only about the object (e.g., equipment or gas plume). As an example, for a thermal image of the object (e.g., equipment or gas plume), the image analysis includes a thermal image analysis that may evaluate the temperature profile, the average temperature, the minimum temperature, the maximum temperature, the temperature at various critical locations (e.g., bearings, seals, pistons, etc.), the temperature trends over time, or any combination thereof, without the results being biased or degraded due to temperatures of the background (e.g., a person standing nearby, a vehicle with an engine running, etc.). Again, the masked image removes the background information, such that the image analysis focuses only on the object. The process 300 may similarly evaluate RGB images and optical gas imaging to achieve more accurate and relevant results associated with the object. By further example, the image analysis may evaluate the shape and size of a gas plume, thereby enabling an analysis of a volume, flow rate, and/or direction of the gas plume. By further example, the image analysis may evaluate trends in the gas plume over time, such as changing directions of flow and/or the flow rate of the gas leak.

In block 318, the process 300 detects an anomaly based on the image analysis. The process 300 may use user inputs, historical data, computer model and/or artificial intelligence, operating specifications, or any combination thereof, to determine which parameters obtained from the image analysis may constitute the anomaly. In certain embodiments, the anomaly detection may include aspects of block 216 of FIG. 3 as discussed in detail above. For example, the image analysis (e.g., thermal image analysis) may identify one or more temperatures (e.g., average temperature, minimum temperature, and/or maximum temperature) that are above an upper threshold and/or below a lower threshold, thereby indicating that an anomaly is present at the object. The temperatures may be anywhere in the masked image, at specific locations of critical components (e.g., seals, bearings, pistons, etc.), at previously repaired locations, or any combination thereof. By further example, the image analysis may identify a gas plume at an unknown or unexpected location, a gas plume above a threshold (e.g., threshold volume, flow rate, etc.) at any location, a gas plume that is trending in a particular way (e.g., trending larger in volume flow rate, etc.) over time, or any combination thereof.

The process 300 may initiate a machine learning/AI training and validation process 305 for the anomaly detection of block 318 by evaluating whether the anomaly is valid at block 320. If the anomaly is not valid at block 320, then the process 305 may proceed to train the anomaly detection by penalizing the machine learning/AI at block 319 and returning to block 318. If the anomaly is valid at block 320, then the process 305 may proceed to train the anomaly detection by rewarding the machine learning/AI at block 321 and proceeding to block 322. The validation of the anomaly may occur automatically without user intervention and/or with user input to accept the anomaly as valid or reject the anomaly as invalid.

In block 322, the process 300 may detect a cause of the anomaly via a root cause analysis. The root cause analysis may use a library of anomalies associated with various sensor feedback and image analyses to determine the cause of the anomaly. The library of anomalies may be based on historical sensor feedback, simulated operational data for the objects and the facility, historical and simulated images of objects, or any combination thereof, for the specific facility 10 and other facilities which have the same or similar objects. For example, the process 300 may determine via the root cause analysis that an unexpected hot spot in the temperature profile of equipment (e.g., pump, compressor, engine, etc.) is caused by a worn or faulty bearing, seal, or piston. As another example, the process 300 may determine via the root cause analysis that a low flowrate of the gas plume is caused by a buildup of materials in an outlet or exhaust stack, a low reaction rate of a reactor, a low combustion rate of a combustion system, or the like.

The process 300 may initiate a machine learning/AI training and validation process 305 for the root cause analysis of block 322 by evaluating whether the determined cause of the anomaly is valid at block 324. If the cause of the anomaly is not valid at block 324, then the process 305 may proceed to train the root cause analysis by penalizing the machine learning/AI at block 323 and returning to block 322. If the cause of the anomaly is valid at block 324, then the process 305 may proceed to train the root cause analysis by rewarding the machine learning/AI at block 325 and proceeding to block 326. The validation of the root cause analysis may occur automatically without user intervention and/or with user input to accept the cause of the anomaly as valid or reject the cause of the anomaly as invalid.

In block 326, the process 300 quantifies the anomaly based on the comparison of the anomaly with the thresholds, historical data, computer models and artificial intelligence, or any combination thereof. For example, the anomaly quantification of block 326 may be the same or similar as described in detail above with reference to block 218 of FIG. 3. As such, the process 300 may compare the anomaly to the thresholds, historical data, and/or computer models and artificial intelligence to determine the severity level of the anomaly.

In block 328, the process 300 performs one or more actions based on the anomaly. For example, the actions of block 328 may be the same or similar as described in detail above with reference to block 220 of FIG. 3. The actions may be performed at least partially or entirely by one or more processor-based computing devices. The actions may include outputting a notification and/or outputting a report describing the anomaly; scheduling and executing an inspection via the sensors and/or cameras; scheduling a manual inspection and/or service of the object by a technician; generating a safe route for the technician to reach the location of the anomaly; and adjusting one or more operating parameters of the facility 10 based on the anomaly.

FIG. 5 is a flowchart of a process 400 for performing an inspection of a gas plume, wherein the process analyzes images of the gas plume via a multi-model process to identify anomalies and/or a health condition of the equipment generating the gas plume. The process 400 may be performed by one or more processor-based computing devices, including the control system 110 of the UAV 14, the control system 122 of the docking station 16, and other computing devices (e.g., 16, 18, 20, 22, and/or 24). The process 400 also may include various aspects of the process 200 of FIG. 3 and the process 300 of FIG. 4. The equipment may include any of the equipment and assets 12 described herein.

In block 402, the process 400 obtains images of the facility 10 having various objects, including one or more gas plumes. The images may be obtained from the one or more fixed cameras and/or the one or more mobile cameras of the UAV 14. The images may include RGB images, thermal images, and/or gas images. In certain embodiments, the images may include multiple images taken at the same time and position using different camera types, so that multiple image types can be used to evaluate the gas plume for analysis of the condition of the equipment. In certain embodiments, the images may include multiple images taken at a plurality of different times (e.g., time increments of seconds, minutes, hours, or days) at the same position, such that trends in the images can be used to evaluate trends in the gas plume and associated conditions of the equipment. In certain embodiments, the images may include multiple images taken at a plurality of different orientations at one or more times, wherein the different orientations of the images can be used to evaluate the gas plume and associated conditions of the equipment. For example, the images may include multiple side view images around the gas plume, a bottom view image of the gas plume and associated equipment if the equipment is elevated, and/or a top view image of the gas plume. In some embodiments, a plurality of images may be acquired 360 degrees around a central axis of the gas plume. The various images may be analyzed independently and/or in combination with one another in the process 400.

In block 404, the process 400 initiates the multi-model process to focus on the AOI of the gas plume in the images. The multi-model process includes focusing the images using the object detection model and the segmentation model as discussed herein. In block 406, the process 400 focuses the images on the AOI with the object detection model to generate the boundary box around the gas plume. The process 400 may use the YOLO model as the object detection model. In particular, the system may use the YOLO version 8 model for fire detection. The process 400 may be configured to differentiate between the gas plume and a cloud. In block 408, the process 400 focuses the images on the AOI with the segmentation model to generate the mask around the gas plume based on the boundary box. The process 400 may use SAM as the segmentation model. SAM can segment different sections of the images accurately, but it does not know what those segments mean. Therefore, it may be necessary to guide it toward areas of interest in the image. One way to do so is to use the thermal image and a mask that extracts the peaks. This way, the area with the highest temperature is always selected and masked by SAM. This approach works in cases where the exhaust temperature is always higher than the surrounding objects in the image. Another approach may be to use the object detection model on objects known to the model. The boundary box around the gas plume may guide the segmentation model toward the specific area for masking. The mask may be overlaid onto the images to generate the masked images. The areas of each mask can be extracted and used for volume calculation during the robot inspection.

In block 410, the process 400 obtains the masked images of the gas plume from the multi-model process. In block 412, the process 400 analyzes the masked images to obtain image analysis of one or more parameters of the gas plume. The one or more parameters may include temperature, flowrate, and direction of the gas plume. In some embodiments, the image analysis may include thermal analysis of the gas plume to provide a temperature distribution map of the gas plume. For example, the thermal analysis may include a thermal map of the gas plume, and one or more thermal values of the gas plume (e.g., an average temperature, a minimum temperature, a maximum temperature, etc.). The image analysis may also include analysis of the RGB images to determine one or more parameters of the gas plume, such as a shape of the gas plume, a position of the gas plume relative to various equipment, a volume of the gas plume, and other geometrical characteristics of the gas plume. In some embodiments, the image analysis may include a volumetric analysis of the gas plume to provide a volume of the gas plume based on an area of the masked images. The image analysis may include a temporal analysis of the gas plume. That is to say, the process 400 may analyze the changes between a plurality of masked images obtained at a plurality of different times. For example, the temporal analysis may include providing a flowrate, a flow direction, or a combination thereof, of the gas plume based on changes between the plurality of masked images.

In block 414, the process 400 analyzes sensor feedback, historical data, computer models, and the image analysis to identify historical trends in the gas plume and predict future trends in the gas plume. The sensor feedback may include measurements in real-time of a gas concentration, a fluid flow rate, a pressure, a temperature, a sound or noise, a vibration, a rotational speed, a power output, or any combination thereof, associated with the gas plume or the equipment generating the gas plume. The process 400 may analyze the sensor feedback, computer models, and image analysis to obtain current values of the one or more parameters of or affecting the gas plume. The process 400 may then add the current values of the one or more parameters to the historical data to identify the trends associated with the one or more parameters. For example, the process 400 may identify a trend indicating the gas plume has been growing consistently over the past week. The process 400 may also use the historical trends and/or the one or more parameters of the gas plume to predict future trends in the gas plume. For example, the process 400 may predict the gas plume will get larger based on the historical trend of the gas plume growing consistently. As another example, the process 400 may use sensor feedback indicating a strong western wind in the area to predict the gas plume will be blowing in a western direction.

In block 416, the process 400 analyzes the sensor feedback, historical data, computer models, image analysis, and trends to obtain equipment analysis. The process 400 may specifically analyze equipment with a designed gas release. The process 400 may use the one or more parameters of the gas plume to determine one or more parameters of the equipment. For example, if the gas plume is a particular temperature at the outlet of the equipment, the process 400 may determine the internal temperature of the equipment. Additionally and/or alternatively, the process 400 may associate the one or more parameters of the gas plume with the equipment based on various computer models and relationships between measured parameters, and thus the one or more parameters of the gas plume may indicate one or more parameters of the equipment or the condition of the equipment. For example, the temperature distribution and volume of the gas plume may indicate the equipment's health. In block 418, the process 400 determines a health condition of the equipment and predicts the life cycle of the equipment based on the equipment analysis in a process known as condition-based monitoring (CBM). Data-based or physics-based models can be used for the CBM analysis and for forecasting the equipment's next maintenance and the remaining life cycle. For example, if the gas plume has been decreasing in size, the process 400 may determine that the equipment is in poor condition due to a buildup of material around the output and predict that future maintenance requires removing the buildup. Additionally, in certain embodiments, the health condition of the equipment may include a health score (e.g., considering all anomalies, possibly with different weighting factors) that indicates the health of the equipment on a scale (e.g., increasing health from 1 to 10, 1 to 100, or the like). Additionally, in certain embodiments, the gas plume may be rated on a score of severity to assist with the determination of the health condition of the equipment.

In block 420, the process 400 identifies and quantifies one or more anomalies in the gas plume and/or health condition of the equipment. The process 400 may analyze thresholds, historical data, user inputs, and maps of the facility 10 to detect and quantify the anomalies. For example, the process 400 may compare the gas plume to a map of known locations of gas plumes at the facility 10. The process 400 may then identify the gas plume as an anomaly if the location is not one of the known locations. As another example, the process 400 may analyze the quantity (i.e., volume and/or flow rate) of the gas plume relative to a threshold quantity of the gas plume. The threshold quantity may be based at least in part on a historical quantity or a predicted quantity of the gas plume. The process 400 may identify the gas plume as the anomaly if the quantity of the gas plume exceeds the threshold quantity for the gas plume. In certain embodiments, the quantification of the anomaly may include an actual value of a measured parameter, an amount or percentage of the measured parameter over a threshold value, an anomaly score for each anomaly, or a combination thereof, as discussed above with reference to block 218 of the process 200 of FIG. 3. In certain embodiments, the quantification of the anomaly may include a score (e.g., a severity score) that indicates the severity of the anomaly on a scale (e.g., increasing severity from 1 to 10, 1 to 100, or the like).

In block 422, the process 400 detects the cause of each anomaly via a root cause analysis substantially the same as discussed above with reference to FIGS. 3 and 4. The process 400 may analyze a data bank to output the cause of the anomaly. For example, if the process 400 detects a fugitive gas plume (i.e., a gas plume issuing from an unexpected source or location) discharging from equipment, the process 400 may determine via a root cause analysis that the pressure of the gas in the equipment exceeded pressure limits of the equipment causing the gas leak.

In block 424, the process 400 trains and improves the object detection model and the segmentation model based on the image analysis, the equipment analysis, the root cause analysis, user input, or any combination thereof. For example, the process 400 may include similar training as discussed above with reference to FIG. 4. As such, the object detection model may be rewarded for generating the boundary box to fit closely around the gas plume and penalized for generating the boundary box such that it fails to capture the entirety of the gas plume and/or fails to minimize the background objects captured. Additionally, the segmentation model may be rewarded for generating a mask that encompasses the gas plume and penalized for generating a mask that includes background structures and/or fails to include the entirety of the gas plume.

In block 426, the process 400 performs actions based on the health condition and/or anomalies. For example, the actions of block 426 may be the same or similar as described in detail above with reference to block 220 of FIG. 3. The actions may include outputting a notification and/or outputting a report describing the health condition and/or anomaly; scheduling and executing an inspection via the sensors and/or cameras; scheduling a manual inspection and/or service of the equipment from which the gas plume is issued by a technician; generating a safe route for the technician to reach the location of the gas plume; and adjusting one or more operating parameters of the facility 10 based on the health condition and/or anomalies.

Figure 6:
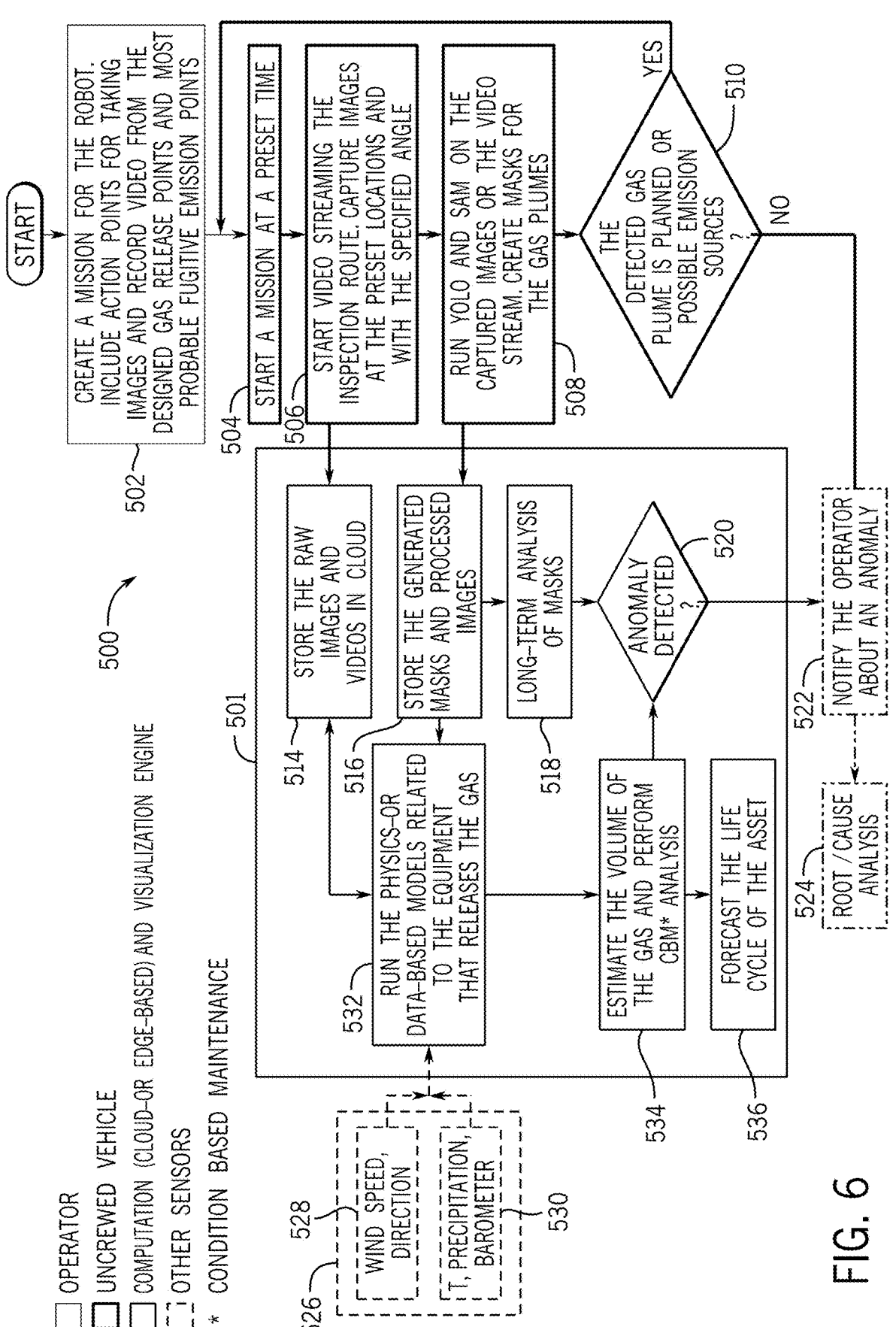
FIG. 6 is a flow chart of a process for performing an analysis of the gas plume using the UAV, in accordance with aspects of the present disclosure.

FIG. 6 is a flow chart of a process 500 for performing an analysis of the gas plume using the UAV 14. The process 500 may be performed by one or more processor-based computing devices, including the control system 100 of the UAV 14, the control system 122 of the docking station 16, and other computing devices (e.g., 16, 18, 20, 22, and/or 24). The process 500 also may include various aspects of the process 200 of FIG. 3, the process 300 of FIG. 4, and the process 400 of FIG. 5.

In block 502, the process 500 creates a mission for the robot (i.e., the UAV 14). A mission is a walking loop in the facility 10 that starts and ends at the docking station 16. The mission may include action points to take images and record video from the designed gas release points and most probable fugitive emission points by sensors 15 of the UAV 14.

The process 500 may automatically create the mission or the mission may be input by the operator as illustrated. The mission may include instructions to take images and record video at a specified angle at each action point. The mission may include inspections of preset locations, which may include locations with a designed gas release, such as a compressor exhaust and an exhaust stack, where there is a known continuous or intermittent gas flow and/or locations that are potential leak sources such as tank batteries, valves, and pipe connections. In block 504, the UAV 14 starts the mission at a preset time. The user may determine the preset time. The preset time may be a specified period of time after the last mission, such that the robot is programmed to repeat the mission at preset time intervals. The process 500 can trigger or modify the robot's routine inspection schedule on demand based on the insights and recommendations obtained from analyzing the other data streams and models from the facility 10. In block 506, the process 500 starts video streaming the inspection route via the one or more cameras of the UAV 14. The process 500 also captures images at the preset locations (i.e., action points) and with the specified angle via the one or more cameras of the UAV 14 as specified in the mission. In block 514, the process 500 stores the raw images and videos in the cloud 22, the UAV 14, the docking station 16, and/or any combination of computing devices (e.g., 16, 18, 20, 22, and/or 24).

In block 508, the process 500 runs an object detection model (e.g., YOLO) and a segmentation model (e.g., SAM) on the captured images and/or the video stream, creating masks for the gas plumes. The models may be run on an edge device, on the robot (e.g., the processor 116 of the UAV 14), or be sent to the cloud 22. However, the models may be run on any suitable processor-based computing devices, such as the computing devices (e.g., 16, 18, 20, 22, and/or 24). The object detection model may generate the boundary box around the gas plume. The segmentation model may then generate the mask around the gas plume using the boundary box as a guide. In block 516, the process 500 stores the generated masks and the processed images (i.e., the masks overlaid onto raw images and videos) in the cloud 22.

In decision block 510, the process 500 determines whether each detected gas plume is planned or comes from a possible fugitive emission source. The process 500 may run such analysis on an edge device, on the robot (e.g., the processor 116 of the UAV 14), or on the cloud 22. If the detected gas plume is planned or comes from a possible fugitive emission source, the process 500 may repeat blocks 504-510 as desired. If the process 500 detects an unexpected gas plume or fire along the inspection route in any location other than the preset locations, the process 500 identifies the unexpected gas plume as the anomaly and notifies the operator about the anomaly in block 522. The process 500 may also perform a root cause analysis of the anomaly in block 524.

The computation (cloud- or edge-based) and visualization engine (hereinafter the engine) 512 may receive and store feedback (i.e., images and sensor feedback). The engine 512 may also process and analyze the feedback to detect anomalies and predict trends. The engine 512 may include computer models and AI executable in the cloud 22. The engine 512 may receive feedback from other sensors 526. The other sensors may include a wind speed and direction sensor 528 (e.g., the anemometer) and/or an environment temperature and humidity sensor 530.

In block 518, the engine 512 may perform a long-term analysis of the masks stored in the cloud 22 in block 516. For example, the UAV 14 may be used to take IR images at a specific location. The raw IR image may be a vector of temperature readings converted to a grayscale image. The pixel values of the converted image may be temperatures, such that the system may output the temperature distribution map of the gas plume. A history of the generated masks may be stored in memory, and comparisons may be made between the shape of the plume at different time scales, for example, the average plume area during springs of two consecutive years. In decision block 520, the engine 512 may determine whether an anomaly was detected based on the long-term analysis of the masks. If the anomaly was detected, the system may notify the operator about the anomaly in block 522 and perform a root cause analysis of the anomaly in block 524. The process 500 may also notify the operator if the engine 512 observes a trend change in the gas plume.

In block 532, the engine 512 may run physics—or data-based models related to the equipment that releases the gas plume using the raw images and videos stored in the cloud 22 in block 514, the masks stored in the cloud 22 in block 516, and the feedback from the other sensors 526. The areas of each mask can be extracted and used for volume calculation during the robot inspection. One or more parameters, such as wind direction, environment temperature, and equipment operating condition, can be added to the model for a more accurate estimation.

In block 534, the engine 512 estimates the volume of the gas and performs the CBM analysis based on the physics-based and/or data-based models. For example, if the distance to the exhaust exit (i.e., the location from which the gas plume is issuing) and the number of pixels that the gas plume occupies is known, the gas plume's volume can be approximately estimated. However, as disclosed herein, the area occupied by the gas plume may change between the plurality of images. As such, the model may be configured to perform calculations to output a corrected volume. The model may calculate the corrected volume as a function of the estimated volume based on the images, the estimated temperature based on the images, the wind speed, the wind direction, and the environment temperature. In decision block 520, the engine 512 may determine whether an anomaly was detected based on the CBM analysis. If the anomaly was detected, the process 500 may notify the operator about the anomaly in block 522 and perform a root cause analysis of the anomaly in block 524. In block 536, the engine 512 forecasts the life cycle of the asset (i.e., the equipment that releases the gas plume).

Figure 7:
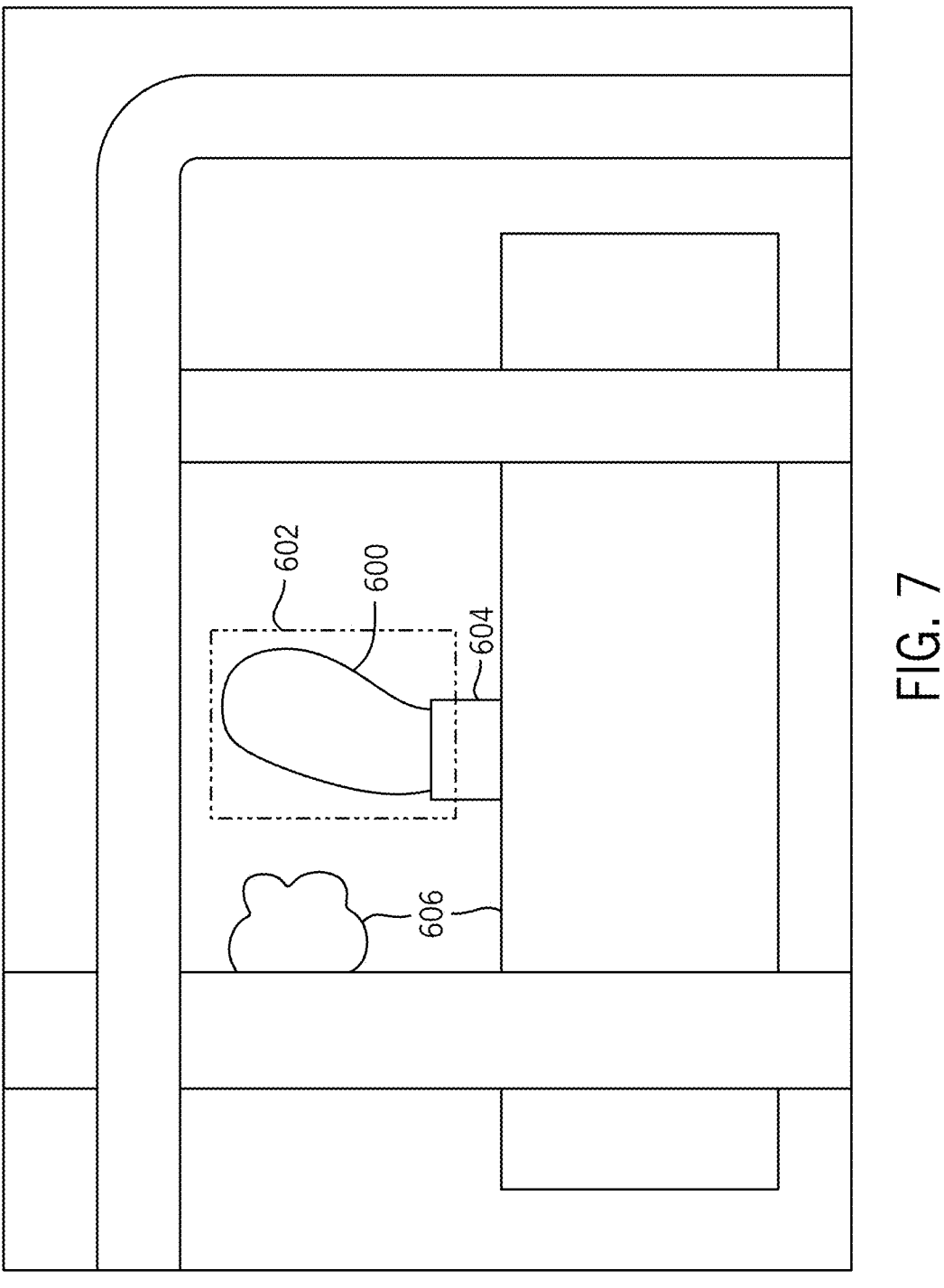
FIG. 7 is a schematic image of a gas plume undergoing image analysis by an object detection model of the multi-model process of FIGS. 3-5, in accordance with aspects of the present disclosure.

FIG. 7 is a schematic image of a gas plume 600 undergoing image analysis by an object detection model of the multi-model process of FIGS. 3-5, wherein the object detection model forms a boundary box 602 around the gas plume 600. In the illustrated embodiment, the gas plume 600 issues from a condenser 604. The object detection model may receive images, detect gas plumes, and generate the boundary box 602 around one or more gas plumes in the images. The images may include thermal images, RGB images, optical gas images, or a combination thereof. The system may use YOLO version 8 for fire detection as the object detection model. In some embodiments, the object detection model may be configured to only detect gas plumes. In the illustrated embodiment, the object detection model is configured to detect and generate the boundary box 602 around the gas plume 600. In the illustrated embodiment, the boundary box 602 is a rectangular or square boundary box. However, the boundary box 602 may be a rectangular or square boundary box, a circular or oval boundary box, a polygonal boundary box having 3, 4, 5, 6, or more sides, or any combination thereof. The temperature distribution map and other data derived from the images is more exact the closer the boundary box 602 is to the gas plume 600. Thus, the object detection model may be configured to substantially exclude the background objects 606 from the boundary box 602. However, the boundary box 602 may include background objects 606 as appropriate to fit the entirety of the gas plume 600 in the boundary box 602. For example, the background objects 606 may include the equipment from which the gas plumes issues, equipment, machinery, clouds, other gas plumes, and other objects. As such, the object detection model may be configured to differentiate the gas plume 600 from the clouds and/or other gas plumes. The object detection model may then output images with the boundary box 602 to the segmentation model. Used alone, the image analysis (e.g., thermal analysis) of the gas plume in the boundary box 602 may produce wide variations in the temperature distribution map that does not reflect the temperature of the gas plume. For example, the outside of the condenser 604 as captured in the boundary box 602 may be at an ambient air temperature (e.g., 72 degrees Fahrenheit) while the gas plume 600 is at a much higher temperature (e.g., 212 degrees Fahrenheit). Thus, the temperature in the boundary box 602 would reflect a lower average temperature than the gas plume 600 is experiencing. To combat this issue, the system may apply the segmentation model to the images with the boundary box 602.

Figure 8:
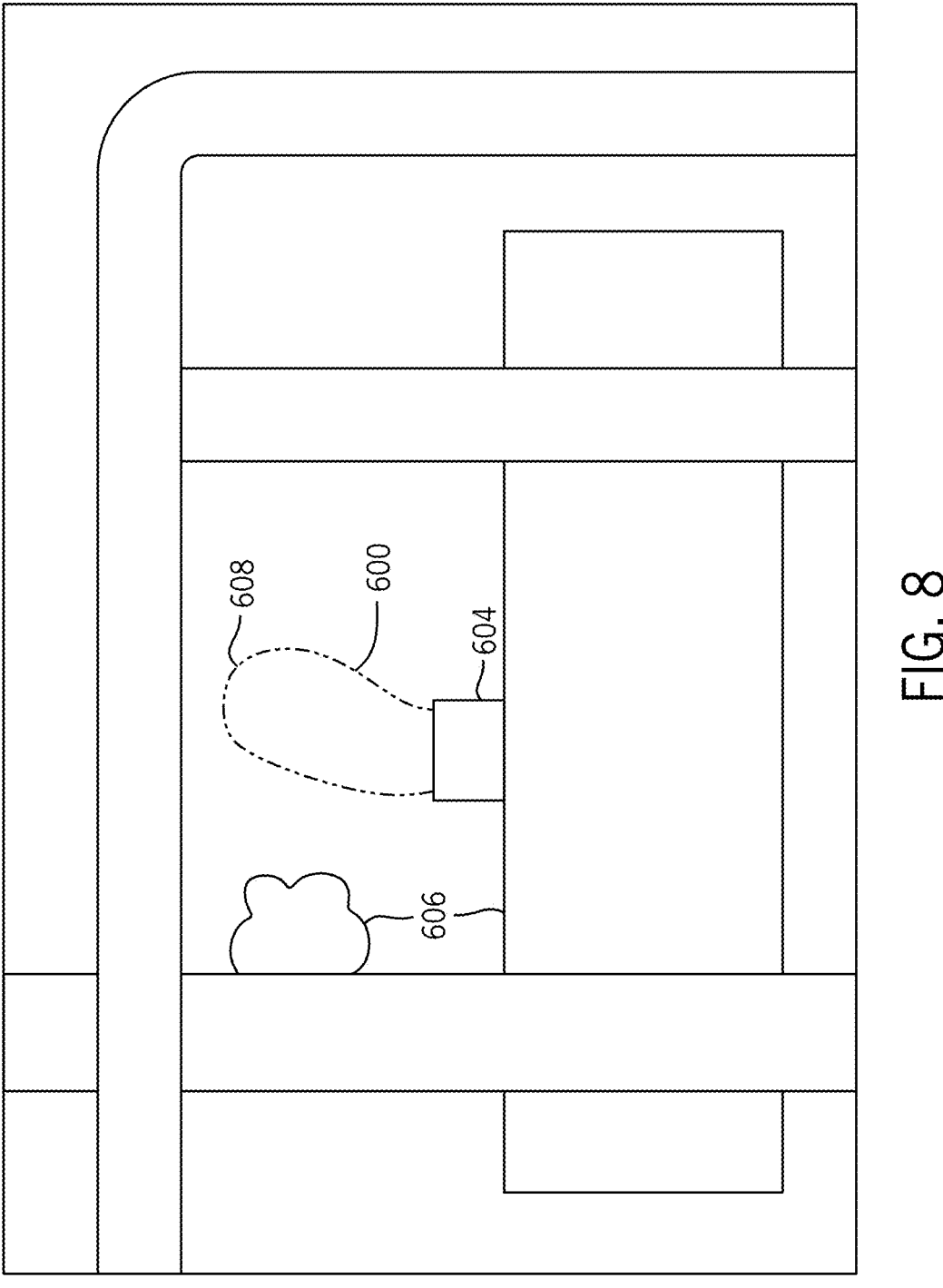
FIG. 8 is a schematic image of a gas plume undergoing image analysis by a segmentation model after the object detection model forms the boundary box in FIG. 7, wherein the segmentation model generates a masked image having a boundary fit directly about the gas plume, in accordance with aspects of the present disclosure.

FIG. 8 is a schematic image of a gas plume 600 undergoing image analysis by a segmentation model after the object detection model forms the boundary box in FIG. 7, wherein the segmentation model generates a masked image having a boundary fit directly about the gas plume 600. The segmentation model may receive the images with the boundary box 602 and generate the mask 608 around the gas plume 600 in the images. Used alone, the segmentation model segments all objects in the images. However, the segmentation model cannot identify which of the segmented objects are gas plumes. Therefore, the boundary box 602 generated by the object detection model may serve as the guide for the segmentation model, such that the segmentation model focuses only on the image contained within the boundary box 602. As illustrated, the segmentation model generates the mask 608 around the gas plume 600, as it was contained in the boundary box 602. However, the mask 608 does not include the background objects 606 that were originally included in the boundary box 602. Thus, the mask 608 has the same geometry (e.g., shape and size) as the perimeter of the gas plume 600, such that only the gas plume 600 is contained within the mask 608. The mask 608 may be overlaid onto the images to generate the masked image. The system may analyze the masked image to determine the one or more parameters of the gas plume 600 as disclosed herein.

Technical effects of the disclosed embodiments include a system and method for detection and inspection of gas plumes in a facility using images of the gas plumes, wherein the images are analyzed according to a multi-model process using object detection and segmentation models. The object detection model focuses on an area of interest (AOI) in the image, such as a particular gas plume, by bounding the gas plume with a boundary box. In turn, the segmentation model uses the focus (e.g., boundary box) provided by the object detection model to further focus analysis of the image on the particular gas plume by fitting a boundary directly around the gas plume to obtain a masked image of the gas plume. Thus, the multi-model process progressively focuses the image on the particular gas plume, thereby eliminating undesirable background information in the image. The disclosed embodiments then analyze the masked image to identify one or more anomalies and/or evaluate the health condition of the equipment from which the gas plume issues. For example, the image analyzed by the disclosed embodiments may be a thermal image, and thus the analysis may identify thermal characteristics of the gas plume, such as a temperature distribution, an average temperature, a maximum temperature, a minimum temperature, a trend in temperature over time, or any combination thereof. The disclosed embodiments substantially improve accuracy of the image analysis by removing the undesirable background information that would otherwise skew the results (e.g., skewed average temperature, skewed maximum and minimum temperatures, skewed temperature trends, etc.). Additionally, the multi-model process substantially increases the efficiency and timelines of the image analysis for more immediate (e.g., real-time) monitoring and control of the equipment in the facility. In other words, the one or more computing devices (e.g., processor-based controllers) may be programmed with the multi-model process described herein to improve the efficiency, accuracy, and performance of the control of equipment in the facility. Thus, by more rapidly identifying anomalies in the equipment, the process can more rapidly control the equipment to reduce or eliminate the anomalies, protect the equipment, and maintain operations of the facility.

The subject matter described in detail above may be defined by one or more clauses, as set forth below.

A system for inspecting one or more gas plumes in a facility, including a processor and a memory having instructions executable by the processor, wherein the instructions are configured to obtain one or more images from one or more cameras, wherein the one or more images include a gas plume. The instructions are further configured to focus the one or more images on an area of interest with an object detection model to generate a boundary box around the gas plume, and focus the one or more images on the area of interest with a segmentation model to generate a mask around the gas plume based on the boundary box. The instructions are further configured to obtain one or more masked images from the segmentation model, and analyze the one or more masked images to obtain an image analysis of one or more parameters of the gas plume.

The system of the preceding clause, including the one or more cameras, wherein the one or more cameras include at least one of a thermal imaging camera, a red green blue (RGB) camera, or an optical gas imaging (OGI) camera. The one or more cameras also include at least one of a fixed position camera and a mobile camera.

The system of any preceding clause, including an unmanned autonomous vehicle (UAV) having at least one of cameras and programmed to inspect the gas plume.

The system of any preceding clause, wherein the one or more parameters of the gas plume include a temperature of the gas plume, a flowrate of the gas plume, a direction of the gas plume, and a volume of the gas plume.

The system of any preceding clause, wherein the image analysis comprises a thermal analysis of the gas plume to provide a temperature distribution map of the gas plume.

The system of any preceding clause, wherein the image analysis comprises a temporal analysis of the gas plume to provide a flow rate, a flow direction, or a combination thereof, of the gas plume based on changes between a plurality of the masked images obtained at a plurality of different times.

The system of any preceding clause, wherein the image analysis comprises a volumetric analysis of the gas plume to provide a volume of the gas plume based on an area of the one or more masked images.

The system of any preceding clause, wherein the instructions are configured to analyze sensor feedback from one or more sensors relating to the one or more parameters of the gas plume, and the one or more sensors comprise a wind sensor, an environmental temperature sensor, an environmental humidity sensor, or a combination thereof.

The system of any preceding clause, wherein the instructions are configured to analyze the sensor feedback, historical data from the one or more sensors and the one or more cameras, one or more computer models, and the image analysis with respect to the gas plume; identify historical trends in the gas plume based on the analysis of the sensor feedback, the historical data, the one or more computer models, and the image analysis; and predict future trends in the gas plume based on the analysis of the sensor feedback, the historical data, the one or more computer models, and the image analysis.

The system of any preceding clause, wherein the instructions are configured to identify one or more anomalies in the health condition of the equipment.

The system of any preceding clause, wherein the instructions are configured to identify one or more anomalies associated with the gas plume based at least in part on the image analysis and perform a root cause analysis to detect a cause of each of the one or more anomalies.

The system of any preceding clause, wherein the instructions are configured to train the object detection model based on the image analysis of the gas plume, an equipment analysis based at least partially on the image analysis, the root cause analysis, user input, or any combination thereof and train the segmentation model based on the image analysis of the gas plume, an equipment analysis based at least partially on the image analysis, the root cause analysis, user input, or any combination thereof.

The system of any preceding clause, wherein the instructions are configured to analyze a location of the gas plume relative to a map of known locations of gas plumes at the facility and identify the gas plume as an anomaly if the location is not one of the known locations.

The system of any preceding clause, wherein the instructions are configured to analyze a quantity of the gas plume relative to a threshold quantity of the gas plume, wherein the quantity comprises a volume or a flow rate of the gas plume, and the threshold quantity is based at least in part on a historical quantity or a predicted quantity of the gas plume and identify the gas plume as an anomaly if the quantity exceeds the threshold quantity for the gas plume.

The system of any preceding claim, wherein the instructions are configured to determine a health condition of equipment based at least in part on the image analysis of the gas plume; predict a life cycle of the equipment based at least in part on the image analysis of the gas plume; and adjust one or more operating parameters related to the equipment based on the health condition, the life cycle, or a combination thereof.

The system of any preceding clause, wherein the object detection model includes a You Only Look Once (YOLO) model and the segmentation model includes a Segment Anything Model (SAM).

A method for inspecting one or more gas plumes of a facility, including obtaining one or more images from one or more cameras, wherein the one or more images include a gas plume. The method further includes focusing the one or more images on an area of interest with an object detection model to generate a boundary box around the gas plume, and focusing the one or more images on the area of interest with a segmentation model to generate a mask around the gas plume based on the boundary box. The method further includes obtaining one or more masked images from the segmentation model, and analyzing the one or more masked images to obtain an image analysis of one or more parameters of the gas plume.

The method of the preceding clause, wherein the one or more parameters of the gas plume include a temperature of the gas plume, a flowrate of the gas plume, a direction of the gas plume, and a volume of the gas plume.

The method of any preceding clause, wherein the object detection model includes a You Only Look Once (YOLO) model and the segmentation model includes a Segment Anything Model (SAM).

A tangible and non-transitory machine readable medium including instructions to obtain one or more images from one or more cameras, wherein the one or more images include a gas plume. The medium further includes instructions to focus the one or more images on an area of interest with an object detection model to generate a boundary box around the gas plume, and focus the one or more images on the area of interest with a segmentation model to generate a mask around the gas plume based on the boundary box. The medium further includes instructions to obtain one or more masked images from the segmentation model, and analyze the one or more masked images to obtain an image analysis of one or more parameters of the gas plume.

The medium of the preceding clause, wherein the one or more parameters of the gas plume include a temperature of the gas plume, a flowrate of the gas plume, a direction of the gas plume, and a volume of the gas plume, wherein the object detection model comprises a You Only Look Once (YOLO) model, wherein the segmentation model comprises a Segment Anything Model (SAM).

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for inspecting one or more gas plumes in a facility, comprising:

a processor; and a memory comprising instructions executable by the processor, wherein the instructions are configured to:

obtain one or more images from one or more cameras, wherein the one or more images include a gas plume;

focus the one or more images on an area of interest with an object detection model to generate a boundary box around the gas plume;

focus the one or more images on the area of interest with a segmentation model to generate a mask around the gas plume based on the boundary box, wherein the object detection model comprises a You Only Look Once (YOLO) model and the segmentation model comprises a Segment Anything Model (SAM);

obtain one or more masked images from the segmentation model; and analyze the one or more masked images to obtain an image analysis of one or more parameters of the gas plume.

2. The system of claim 1, comprising the one or more cameras, wherein the one or more cameras comprise at least one of a thermal imaging camera, a red green blue (RGB) camera, or an optical gas imaging (OGI) camera, and wherein the one or more cameras comprise at least one of a fixed position camera and a mobile camera.

3. The system of claim 1, comprising an unmanned autonomous vehicle (UAV) having at least one of the one or more cameras, wherein the UAV is programmed to inspect the gas plume.

4. The system of claim 1, wherein the one or more parameters of the gas plume include a temperature of the gas plume, a flowrate of the gas plume, a direction of the gas plume, and a volume of the gas plume.

5. The system of claim 1, wherein the image analysis comprises a thermal analysis of the gas plume to provide a temperature distribution map of the gas plume.

6. The system of claim 1, wherein the image analysis comprises a temporal analysis of the gas plume to provide a flowrate, a flow direction, or a combination thereof, of the gas plume based on changes between a plurality of the one or more masked images obtained at a plurality of different times.

7. The system of claim 1, wherein the image analysis comprises a volumetric analysis of the gas plume to provide a volume of the gas plume based on an area of the one or more masked images.

8. The system of claim 1, wherein the instructions are configured to analyze sensor feedback from one or more sensors relating to the one or more parameters of the gas plume, and the one or more sensors comprise a wind sensor, an environmental temperature sensor, an environmental humidity sensor, or a combination thereof.

9. The system of claim 8, wherein the instructions are configured to:

analyze the sensor feedback, historical data from the one or more sensors and the one or more cameras, one or more computer models, and the image analysis with respect to the gas plume;

identify historical trends in the gas plume based on the analysis of the sensor feedback, the historical data, the one or more computer models, and the image analysis; and predict future trends in the gas plume based on the analysis of the sensor feedback, the historical data, the one or more computer models, and the image analysis.

10. The system of claim 1, wherein the instructions are configured to:

identify one or more anomalies associated with the gas plume based at least in part on the image analysis; and perform a root cause analysis to detect a cause of each of the one or more anomalies.

11. The system of claim 10, wherein the instructions are configured to:

train the object detection model based on the image analysis of the gas plume, an equipment analysis based at least partially on the image analysis, the root cause analysis, user input, or any combination thereof; and train the segmentation model based on the image analysis of the gas plume, an equipment analysis based at least partially on the image analysis, the root cause analysis, user input, or any combination thereof.

12. The system of claim 1, wherein the instructions are configured to:

analyze a location of the gas plume relative to a map of known locations of gas plumes at the facility; and identify the gas plume as an anomaly if the location is not one of the known locations.

13. The system of claim 1, wherein the instructions are configured to:

analyze a quantity of the gas plume relative to a threshold quantity of the gas plume, wherein the quantity comprises a volume or a flowrate of the gas plume, and the threshold quantity is based at least in part on a historical quantity or a predicted quantity of the gas plume; and identify the gas plume as an anomaly if the quantity exceeds the threshold quantity for the gas plume.

14. The system of claim 1, wherein the instructions are configured to:

determine a health condition of equipment based at least in part on the image analysis of the gas plume;

predict a life cycle of the equipment based at least in part on the image analysis of the gas plume; and adjust one or more operating parameters related to the equipment based on the health condition, the life cycle, or a combination thereof.

15. A method for inspecting one or more gas plumes in a facility, comprising:

obtaining one or more images from one or more cameras, wherein the one or more images include a gas plume;

focusing the one or more images on an area of interest with an object detection model to generate a boundary box around the gas plume;

focusing the one or more images on the area of interest with a segmentation model to generate a mask around the gas plume based on the boundary box, wherein the object detection model comprises a You Only Look Once (YOLO) model and the segmentation model comprises a Segment Anything Model (SAM);

obtaining one or more masked images from the segmentation model; and analyzing the one or more masked images to obtain an image analysis of one or more parameters of the gas plume.

16. The method of claim 15, wherein the one or more parameters of the gas plume include a temperature of the gas plume, a flowrate of the gas plume, a direction of the gas plume, and a volume of the gas plume.

17. A tangible and non-transitory machine readable medium comprising instructions to:

obtain one or more images from one or more cameras, wherein the one or more images include a gas plume;

focus the one or more images on an area of interest with an object detection model to generate a boundary box around the gas plume;

focus the one or more images on the area of interest with a segmentation model to generate a mask around the gas plume based on the boundary box;

obtain one or more masked images from the segmentation model; and analyze the one or more masked images to obtain an image analysis of one or more parameters of the gas plume, wherein the one or more parameters of the gas plume include a temperature of the gas plume, a flowrate of the gas plume, a direction of the gas plume, and a volume of the gas plume, wherein the object detection model comprises a You Only Look Once (YOLO) model, and wherein the segmentation model comprises a Segment Anything Model (SAM).

\* \* \* \* \*